United States Patent
Yamamoto et al.

(10) Patent No.: US 7,436,543 B2
(45) Date of Patent: Oct. 14, 2008

(54) COLOR SEPARATION BASED ON INK CHARACTERISTICS

(75) Inventors: Yuko Yamamoto, Nagano-ken (JP); Koichi Yoshizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 902 days.

(21) Appl. No.: 10/840,960

(22) Filed: May 7, 2004

(65) Prior Publication Data
US 2005/0007608 A1    Jan. 13, 2005

(30) Foreign Application Priority Data
May 13, 2003    (JP)    .............. 2003-134004

(51) Int. Cl.
*H04N 1/60* (2006.01)
*G06K 9/00* (2006.01)

(52) U.S. Cl. .......... 358/1.9; 358/518; 358/523; 358/504; 382/162; 382/167

(58) Field of Classification Search ............ 358/1.9, 358/2.1, 518, 520, 525, 501, 3.23, 3.06, 523, 358/504; 382/162, 167; 345/601–604, 590–591, 345/593; 347/43, 15, 19
See application file for complete search history.

(56) References Cited

U.S. PATENT DOCUMENTS

| | | | |
|---|---|---|---|
| 6,637,861 B2 * | 10/2003 | Yamamoto | .......... 347/43 |
| 6,690,489 B1 * | 2/2004 | Jacob et al. | .......... 358/1.9 |
| 6,783,203 B2 * | 8/2004 | Fujimori | .......... 347/15 |
| 7,251,058 B2 * | 7/2007 | Pop | .......... 358/1.9 |
| 7,298,524 B2 * | 11/2007 | Shibata et al. | .......... 358/1.9 |
| 2002/0163669 A1 * | 11/2002 | Yamazaki et al. | .......... 358/3.23 |
| 2003/0001860 A1 * | 1/2003 | Yamazaki et al. | .......... 345/590 |
| 2005/0094199 A1 * | 5/2005 | Blumberg | .......... 358/1.15 |

FOREIGN PATENT DOCUMENTS

JP    10-191089    7/1998

OTHER PUBLICATIONS

Abstract of Japanese Patent Publication No. 10-191089, Pub. Date: Jul. 21, 1998, Patent Abstracts of Japan.

* cited by examiner

*Primary Examiner*—Edward L. Coles
*Assistant Examiner*—Charlotte M Baker
(74) *Attorney, Agent, or Firm*—Martine Penilla & Gencarella, LLP

(57) ABSTRACT

The ratio of ink quantities for reproducing achromatic color by a mixture of primary color inks is termed primary color mixture ratio. A primary coloring factors correlated to the primary color mixture ratio is established for each primary color ink. The ratio of each ink quantity is adjusted based on the primary coloring factor.

12 Claims, 16 Drawing Sheets

Fig.5

| Ink | | C | M | Y | K |
|---|---|---|---|---|---|
| Colorant | Type(C.I.) | PB15:3 | PV19 | PY74 | PBk7 |
| | Concentration | 1.5 | 2.0 | 3.0 | 2.0 |
| Dispersant | | 1.0 | 0.7 | 1.0 | 1.0 |
| Glycerin | | 15.0 | 15.0 | 15.0 | 15.0 |
| Ethylene glycol | | 5.0 | 5.0 | 5.0 | 5.0 |
| 2-pyrrolidone | | 2.0 | 2.0 | 2.0 | 2.0 |
| 1,2-hexanediol | | 5.0 | 5.0 | 5.0 | 5.0 |
| SURFYNOL E1010 | | 0.5 | 0.5 | 0.5 | 0.5 |
| Deionized water | | q.v. | q.v. | q.v. | q.v. |

(wt%)

Dispersant: styrene/acrylic acid copolymer

PY: Pigment Yellow
PB: Pigment Blue
PV: Pigment Violet
PBk: Pigment Black

CYAN TONE VALUE = 0

MODEL COLOR SPACE

PRIMARY COLOR SPACE

MODEL COLOR SPACE

PRIMARY COLOR SPACE $R = M + Y$ $M \leqq 80$
$Y \leqq 80$
$R \leqq 80$
$M + Y + R \leqq 200$

COLOR SEPARATION BASED ON INK CHARACTERISTICS

BACKGROUND OF THE INVENTION

1. Field of the Invention

This invention relates to a color printing technique employing a plurality of kinds of ink.

2. Description of the Related Art

In recent years, color ink jet printers have come to enjoy widespread use as image output devices. A typical color ink jet printer employs, in addition to black (K) ink, several kinds of ink of the hues cyan C, magenta M, and yellow Y. Any color in a color image can be reproduced using these several kinds of ink.

In a printer of this kind, ink amounts of each useable ink are determined according to any color to reproduce a color image. Herein, the process of determining ink amount of each ink used in printing for color reproduction in this manner will be termed a "color separation process" or "ink color separation process." Relationships of correspondence among color data of a color image and amounts of each color ink are pre-stored in a color conversion lookup table (LUT); during printing, amounts of each color ink at each pixel position are determined with reference to the LUT (see JP10-191089A, for example).

In preferred practice, the color conversion lookup table will be created such that colors represented by color data for a color image, and hue in particular, is reproduced faithfully. Thus, relationships of correspondence among color data and ink amount combinations are determined on the basis of reproduction results obtained through actual reproduction of a plurality of color patches or color samples. At this time, in order to achieve good color conversion accuracy of any color, a plurality of color patches are prepared so as to include a plurality of colors that differ in at least hue, saturation, or lightness. Human perception is particularly sensitive to deviation from achromatic color. Accordingly, it is desirable to faithfully reproduce color patches close to achromatic color, to improve color conversion accuracy for colors close to achromatic color.

In some instances, chromatic primary color inks actually used for printing have different coloring, depending on the ink. Coloring refers to the intensity of effect on reproduced color; for example, if ink quantity is small when an achromatic color is reproduced by a color mixture, it can be that coloring is high. Here, with regard to color patches using inks with relatively strong coloring, in some instances the color balance will be biased towards the color of the ink with strong coloring. Significant bias, particularly for color patches close to an achromatic color, can result in lower accuracy of color conversion for colors close to the achromatic color.

SUMMARY OF THE INVENTION

An object of the present invention is to create a color conversion lookup table that affords good accuracy of color conversion regardless of coloring of the inks.

According to an aspect of the present invention, there is provided a method of creating a color conversion lookup table for converting input color image data represented by a first color system to second color image data represented by a reproduction color system. The reproduction color system is a color system for reproducing color on a print medium using an ink set including a plurality of inks that used in combination can reproduce achromatic color. The plurality of chromatic primary color inks have unequal balance of ink quantities when achromatic color is reproduced, Here, ink quantities of the plurality of chromatic primary color inks constitute another color space referred to as primary color space. The method comprises: (a) establishing a first correspondence relationship for converting a first tone value set represented by the first color system to a model color tone value set represented by a model color system, the model color system being a hypothetical color system of a plurality of hypothetical chromatic primary color inks; (b) establishing a color separation correspondence relationship for converting a model tone value set for each of a plurality of input colors within the model color system into a combination of ink quantities of the ink set; and (c) generating, based on the first correspondence relationship and the color separation correspondence relationship, a correspondence relationship between a first tone value set represented by the first color system and a combination of ink quantities of the ink set, and storing the generated correspondence relationship in a color conversion lookup table.

In one embodiment, the step (b) includes the step of (b1) establishing a primary coloring factor for each of the plurality of chromatic primary color inks. The primary coloring factor is correlated to a primary color mixture ratio which is a ratio of ink quantities when achromatic color is reproduced by a mixture of the plurality of chromatic primary color inks. The step (b) further includes the step of (b2) determining a combination of ink quantities of the ink set as a color separation ink quantity set associated with each of the plurality of input colors. The determining is made such that a ratio of ink quantities of the color separation ink quantity set represented in the primary color space is equal to a ratio of tone values of the model tone value set for each input color multiplied by the primary coloring factors for the chromatic primary color inks.

This method will create a color conversion lookup table having high color conversion accuracy regardless of coloring of the inks.

In preferred practice, in the aforementioned color conversion lookup table, deviation of the ratio of the primary color coloring factor from the primary color coloring ratio is no more than 40%.

In this arrangement, in the color balance of reproduced color can be minimized, making it possible to create a color conversion lookup table that affords good accuracy of color conversion.

In preferred practice, in the aforementioned color conversion lookup table, the ratio of the primary color coloring factor is equal to the primary color mixture ratio.

In this arrangement, bias in the color balance of reproduced color can be minimized appropriately on the basis of coloring of a chromatic primary color ink, making it possible to create a color conversion lookup table that affords good accuracy of color conversion.

In preferred practice, in the aforementioned color conversion lookup table, the ink set includes at least one spot color ink of different hue than any of the chromatic primary color inks; and where ink quantities of the plurality of chromatic primary color inks corresponding to ink quantity of a spot color ink when the spot color ink is substituted for a combination of a plurality of the chromatic primary color inks to reproduce substantially the same hue and saturation is termed substitution ink quantity, ink quantities of the chromatic primary color inks when the color separation ink quantity set is represented by the primary color space are determined by substituting ink quantity of the plurality of chromatic primary color inks for the spot color ink quantity included in the color separation ink quantity set on the basis of the substitution ink quantity.

In this arrangement, even in instances where a spot color ink is used, bias in the color balance of reproduced color can be minimized appropriately on the basis of coloring of a chromatic primary color ink, making it possible to create a color conversion lookup table that affords good accuracy of color conversion.

In preferred practice, in the aforementioned color conversion lookup table, the step (b2) comprises the steps of (b2-1) where color at the outermost shell location within a model color space represented with color tone values of the model color space as base vectors is termed outermost shell color, an outermost shell color separation ink quantity set associated with the outermost shell color is determined such that the ratio of each ink quantity when the outermost shell color separation ink quantity set is represented by the primary color space is equal to the ratio of each tone value of the model tone value set for the outermost shell color, multiplied by the primary color coloring factor; and (b2-2) the plurality of color separation ink quantity sets associated with the plurality of input colors in the model color system are determined on the basis of the relationship between the outermost shell color and the outermost shell color separation ink quantity set.

In this arrangement, since the color separation ink quantity set associated with an input color is determined on the basis of an outermost shell color separation ink quantity set that has been determined so as to minimize bias in the color balance of reproduced color, it is possible to determine a color separation ink quantity set with reduced bias of color balance due to coloring of chromatic primary color ink.

In preferred practice, in the aforementioned color conversion lookup table, the step (b2-2) employs as the color separation ink quantity set a proportional color separation ink quantity set, derived by multiplying the outermost shell color separation ink quantity set for outermost shell color having the same vector direction as the input color in the model color space, by the ratio of the input color vector length to the outermost shell color vector length.

In this arrangement, it is a simple matter to establish a color separation ink quantity set associated with an input color, and having reduced bias of color balance due to coloring of chromatic primary color ink.

In preferred practice, in the aforementioned color conversion lookup table, the step (b2-1) comprises the step of establishing the upper limit of useable ink quantity per unit of area of the print medium as an ink duty limit; and wherein determination of the outermost shell color separation ink quantity set is performed so as to meet the following condition: (i) the outermost shell color separation ink quantity set is within the ink duty limit.

In this arrangement, since ink quantity is limited by an ink duty limit, a color separation suited to the particular characteristics of print medium can be created.

In preferred practice, in the aforementioned color conversion lookup table, determination of the outermost shell color separation ink quantity set is performed so as to meet the following condition: (ii) vector length when the outermost shell color separation ink quantity set is represented by the primary color space is the greatest length within the range reproducible by the ink set.

In this arrangement, it is possible to create a color conversion lookup table that effectively utilizes the color reproduction range reproducible by the ink set.

In preferred practice, in the aforementioned color conversion lookup table, determination of the outermost shell color separation ink quantity set is performed so as to meet the following condition: (iii) total ink quantity of the outermost shell color separation ink quantity set is the smallest possible.

In this arrangement, savings in amount of ink used are afforded.

In preferred practice, in the aforementioned color conversion lookup table, the ink set includes black ink, and the step (b) comprises the step of calculating a corrected input color composed of a plurality of chromatic primary color components from which the black component has been removed by means of an under color removal process of the black ink, performed on the input color; wherein the color separation ink quantity set is determined depending on the corrected input color.

In this arrangement, the color reproduction range can be extended.

The present invention may take any of a number of different embodiments, for example, a image data conversion method and apparatus, printing method and printing apparatus, or color conversion lookup table creation method and apparatus employing the color separation method; a computer program for realizing the functions of such a method or apparatus; a storage medium having such a computer program recorded thereon; a data signal containing such a computer program and embodied in a carrier wave, or the like.

These and other objects, features, aspects, and advantages of the present invention will become more apparent from the following detailed description of the preferred embodiments with the accompanying drawings.

BRIEF DESCRIPTION OF THE DRAWINGS

FIG. 5 illustrates an ink set.

FIG. 14 illustrates nozzle array on the bottom face of print head 28a.

DESCRIPTION OF THE PREFERRED EMBODIMENT

Figure 1:
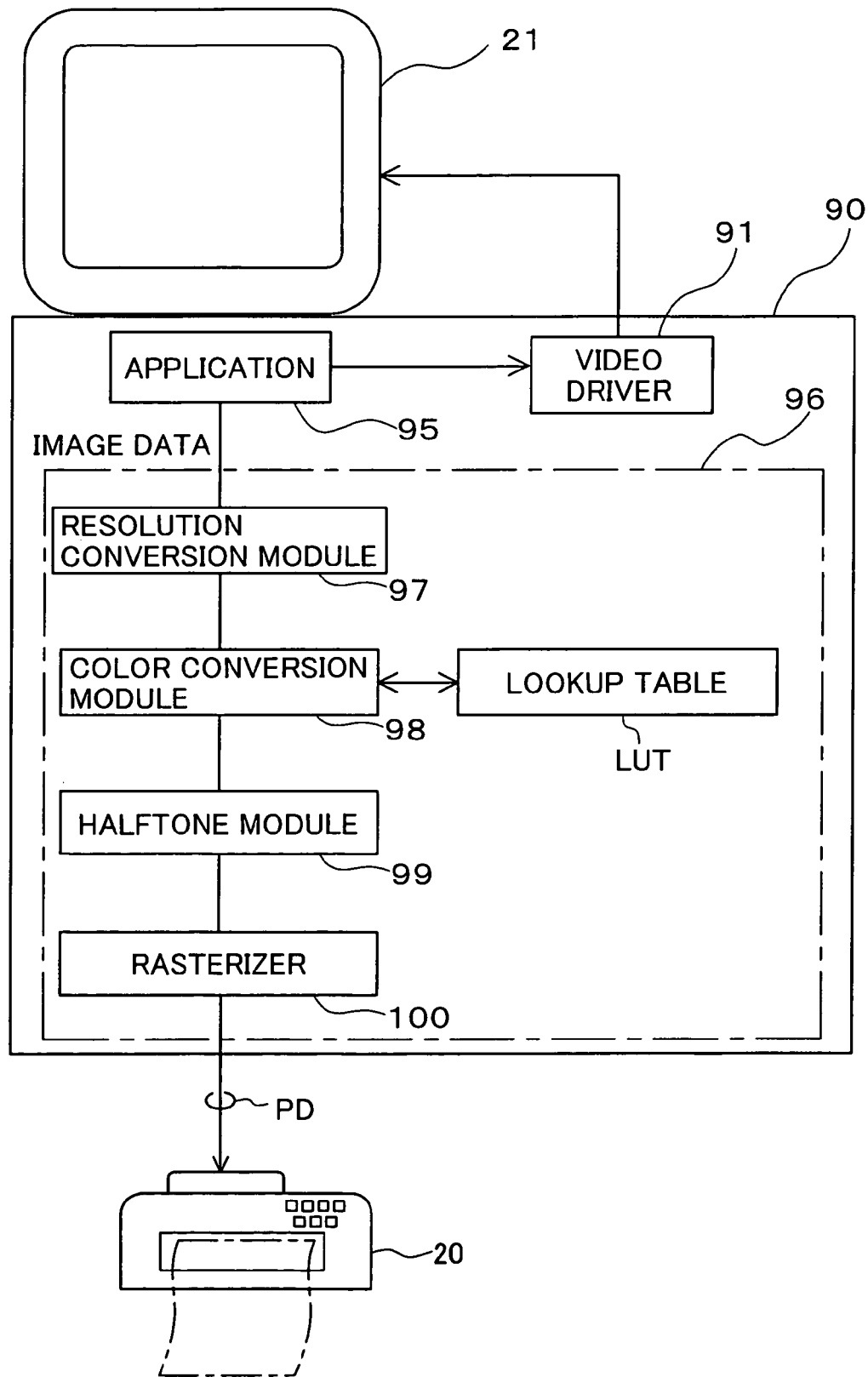
FIG. 1 is a block diagram showing the arrangement of a printing system.

The embodiments of the invention are described in the following order.
A. Apparatus Configuration
B. Embodiment 1 of Color Separation Process C. Embodiment 2 of Color Separation Process
D. Embodiment 3 of Color Separation Process
E. Embodiment 4 of Color Separation Process
F. Variation Examples A. Apparatus Configuration:

FIG. 1 is a block diagram showing the configuration of a printing system in a first embodiment of the invention. This printing system comprises a computer 90 as the image data processing device, and a color printer 20 as a printing unit. Computer 90 and color printer 20 can together be termed a "printing apparatus" in a broad sense.

On computer 90, an application program 95 runs on a predetermined operating system. This operating system includes inter alia a video driver 91, and a printer driver 96. The application program 95 sends print data PD to printer 20 via these drivers. Application program 95, which performs functions such as image retouching, also performs desired processing of images to be processed, as well as displaying images on a CRT 21 via the video driver 91.

When the application program 95 issues a Print command, the printer driver 96 of computer 90 receives image data from the application program 95, and converts this into print data PD to be supplied to the printer 20. In the example shown in FIG. 1, printer driver 96 includes a resolution conversion module 97, a color conversion module 98, a halftone module 99, a rasterizer 100, and a color conversion lookup table LUT.

Resolution conversion module 97 has the function of converting the resolution (i.e. the number of pixels per unit of distance) of color image data produced by the application program 95 into print resolution. The resolution-converted image data is still composed of three color components RGB. Color conversion module 98, while making reference to the color conversion lookup table LUT, converts the RGB image data (input color image data) for each pixel into multitone data (output color image data) of a plurality of ink colors utilizable by the printer 20.

The color-converted multitone data has multi level value for 256 tones, for example. Halftone module 99 executes a so-called "halftone" process to generate halftone image data. The halftone image data is arranged by rasterizer 100 in the order in which the data will be sent to the printer 20, for output as final print data PD. Print data PD includes raster data that indicates dot recording states during each main scan, and data that indicates sub-scan feed distance.

The printer driver 96 corresponds to a program for performing the function of generating print data PD. The program for performing the function of printer driver 96 is provided recorded in computer-readable form on a recording medium. Typical recording media include flexible disks; CD-ROM; magnetooptical disks; IC cards; ROM cartridges; punch cards; printed matter imprinted with symbols such as bar codes; computer internal storage devices (e.g. RAM, ROM or other type of memory) and external storage devices; and other such computer-readable storage media.

Figure 2:
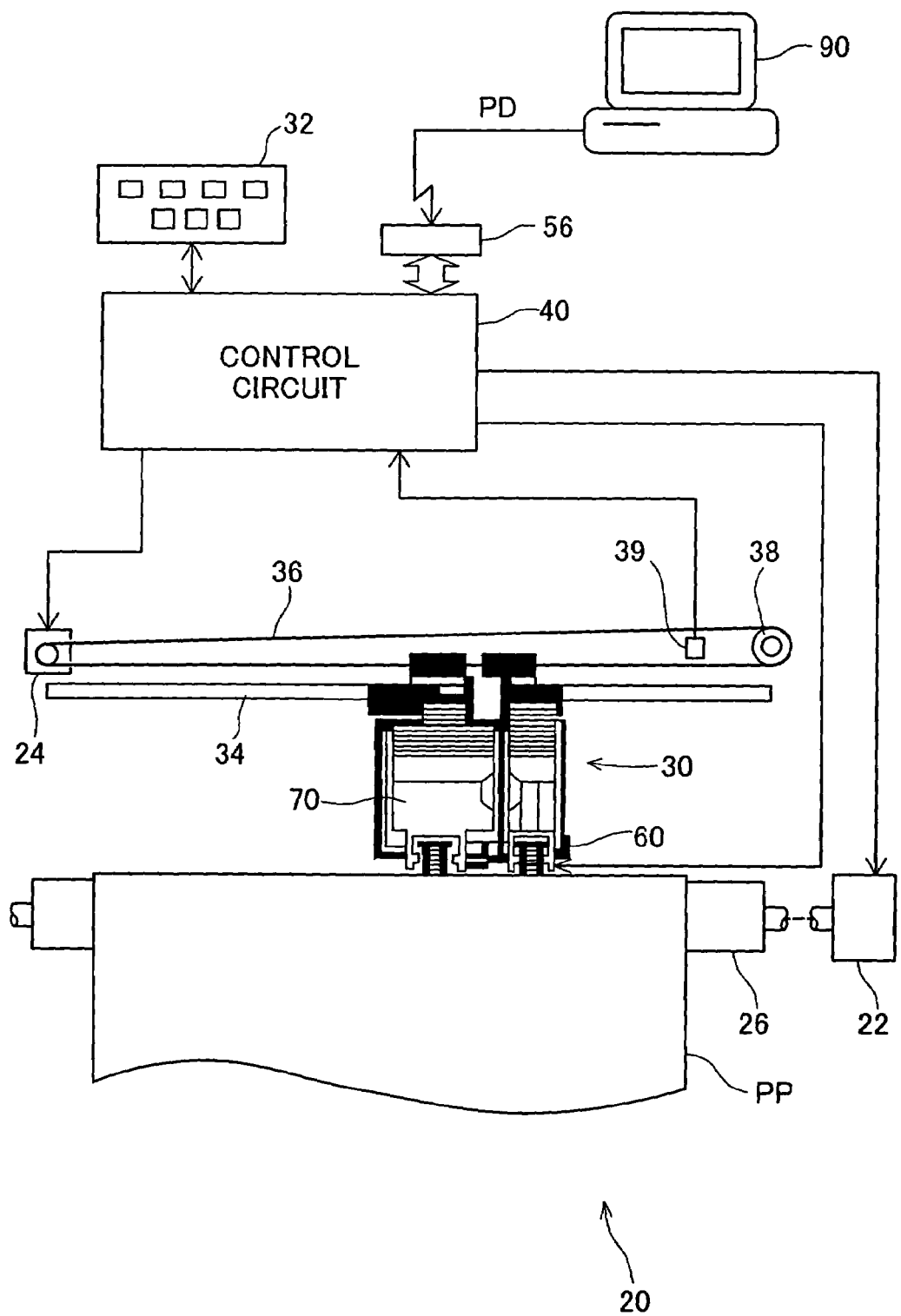
FIG. 2 is a simplified schematic of a printer.

FIG. 2 is a simplified schematic of printer 20. Printer 20 comprises a sub-scan feed mechanism for advancing printing paper PP in the sub-scanning direction by means of a paper feed motor 22; a main scan feed mechanism for reciprocating a carriage 30 in the axial direction of a platen 26 (i.e. main scanning direction) by means of a carriage motor 24; a head drive mechanism for driving a print head unit 60 carried on carriage 30, and controlling ink ejection and dot formation thereby; and a control circuit 40 for exchange signals with the paper feed motor 22, carriage motor 24, print head unit 60 and a control panel 32. The control circuit 40 is connected to computer 90 via a connector 56.

The sub-scan feed mechanism for advancing print paper PP in the sub-scanning direction comprises a gear train (not shown) for transmitting rotation of the paper feed motor 22 to the platen 26 and paper feed rollers (not shown). The main scan feed mechanism for reciprocating the carriage 30 comprises a slide rail 34 extending parallel to the axis of platen 26, for slidably retaining the carriage 30; a pulley 38 around which is passed an endless belt 36 that extends to the carriage motor 24; and a position sensor 39 for sensing the home position of the carriage 30.

Figure 3:
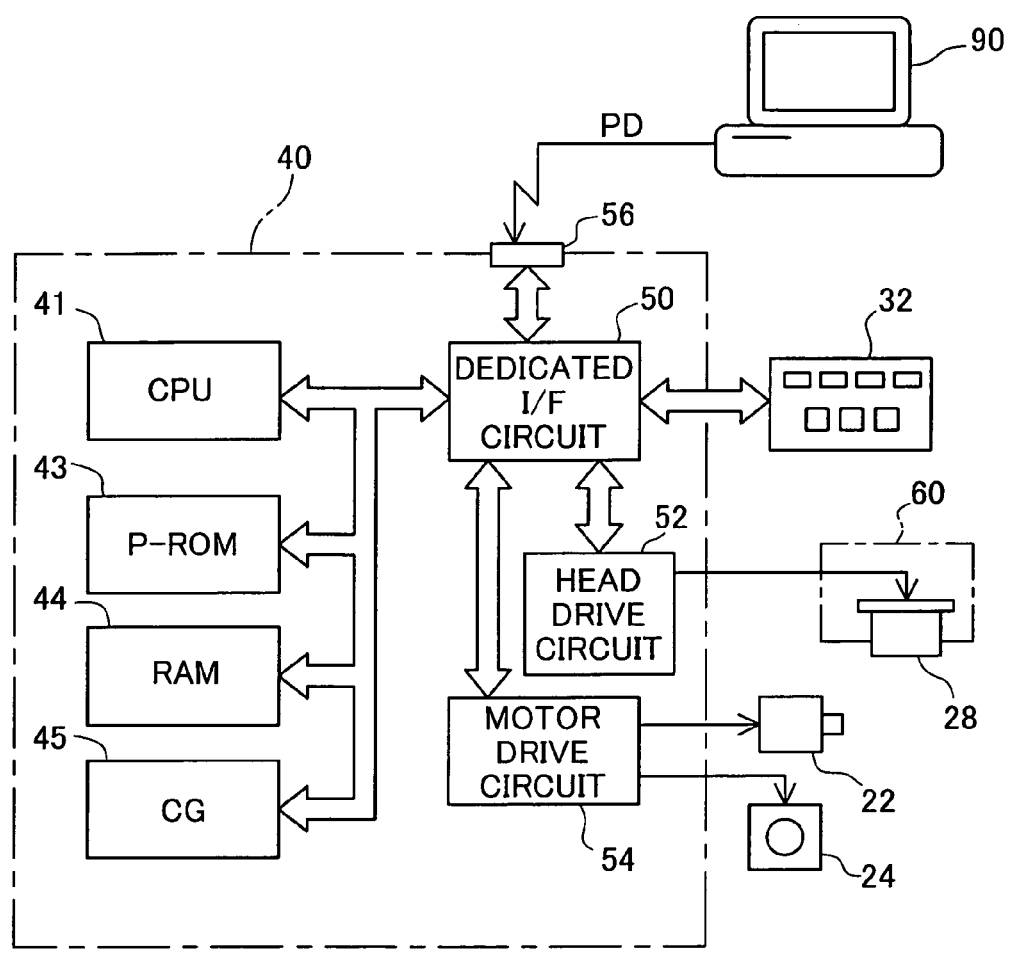
FIG. 3 is a block diagram of the arrangement of printer.

FIG. 3 is a block diagram of the arrangement of printer 20, focusing on the control circuit 40. The control circuit 40 constitutes an arithmetic/logic circuit comprising a CPU 41, programmable ROM (PROM) 43, RAM 44, and a character generator (CG) 45 for storing character dot matrices. The control circuit 40 additionally comprises a dedicated I/F circuit 50 dedicated exclusively to interface with external motors, etc.; a head drive circuit 52 connected to the dedicated I/F circuit 50, for driving the print head unit 60 to eject ink; and a motor drive circuit 54 for actuating the paper feed motor 22 and carriage motor 24. The dedicated I/F circuit 50 includes a parallel interface circuit allowing it to receive print data PD supplied by computer 90 via connector 56. Circuitry within dedicated I/F circuit 50 is not limited to a parallel interface circuit; in view of ease of connection to computer 90, communication speed, etc., a universal serial bus interface circuit or the like may be used instead. Printer 20 executes printing in accordance with the print data PD. RAM 44 functions as a buffer memory for temporarily storing raster data.

Print head unit 60 has a print head 28, and accommodates installation of ink cartridges containing compatible inks. Print head unit 60 detachably installs onto printer 20 as a single unit. That is, to replace print head 28, the entire print head unit is replaced.

Figure 4:
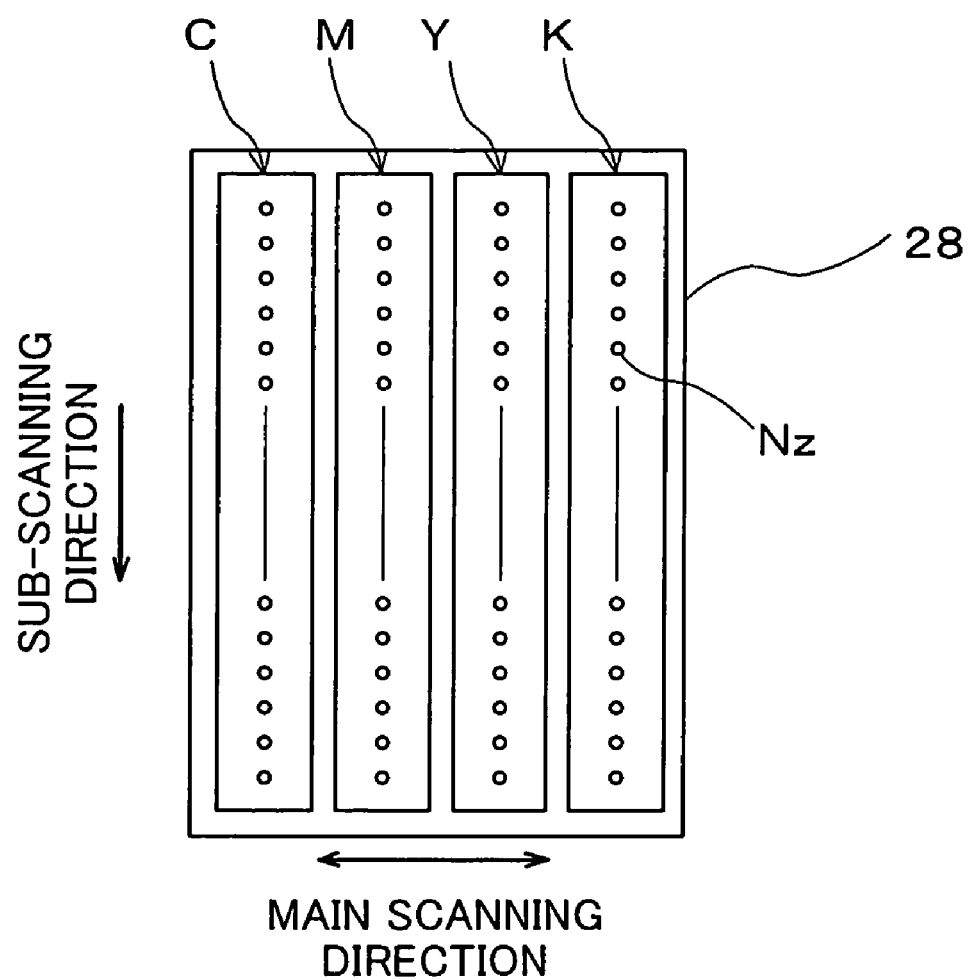
FIG. 4 illustrates ink nozzle arrangement on the lower face of print head 28.

FIG. 4 illustrates ink nozzle arrangement on the lower face of print head 28. On the lower face of print head 28 are arranged a nozzle group for ejecting cyan ink C, a nozzle group for ejecting magenta ink M, a nozzle group for ejecting yellow ink Y, and a nozzle group for ejecting black ink K. In this embodiment, it is possible to use an ink set composed of the four inks C, M, Y, and K. In the example of FIG. 4, the plurality of nozzles Nz of a single nozzle group are arranged in a line in the sub-scanning direction SS, but may instead be arranged in a zigzagged configuration.

FIG. 5 depicts ink components of the CMYK color inks of the ink set in this embodiment. Color inks are deionized water-based, and contains various kinds of colorant consisting of dyes or pigments to impart the desired color, or a mixed solution additionally containing a suitable amount of ethylene glycol or the like added to modify viscosity. The type of colorant is indicated by the color index (CI) of the colorant.

Cyan ink C, magenta ink M, and yellow ink Y may be used in combination to reproduce gray (achromatic color), and they are referred to as chromatic primary color inks. Here, the ratio of ink quantities when reproducing achromatic color with a color mixture is termed "primary color mixture ratio." A smaller primary color mixture ratio for a particular ink means that the ink has stronger coloring. In other words, an ink with stronger coloring can reproduce color with a smaller ink quantity.

In consideration of the picture quality of a printed image, in some instances, primary color mixture ratios, i.e. coloring balance, may not be equal. From the standpoint of using less ink, or meeting an ink duty limit which imposes a limit on ink quantity (described in detail hereinbelow), it is desirable for coloring to be stronger. On the other hand, in terms of improving graininess of a printed image, it is preferable to avoid excessively strong coloring, and increase the number of ink dots in bright areas of the image. Accordingly, with regard to an ink for which ink dots may possibly be produced in bright image areas, and which ink dots have a tendency to stand out, by suppressing the coloring of the ink; or with regard to an ink for which ink dots have a tendency to not stand out, by increasing the coloring of the ink, it becomes possible to improve picture quality of the printed image. For example, in certain instances, ink dots of yellow ink Y tend not to stand out in relative terms, whereas cyan ink C and magenta ink M tend to stand out in relative terms. In such instances, by increasing the coloring of the yellow ink Y relative to the other inks C, M, it becomes possible to perform printing with good picture quality through an expanded color reproduction range in the yellow ink Y direction. In the example in FIG. 5, the primary color mixture ratio C:M:Y is 0.83:1.00:0.33, with coloring of yellow ink Y being higher relative to the other inks C, M. The coloring of an ink can be varied by changing the type of colorant contained in the ink. Where a given type of colorant is used, coloring can be increased by increasing the concentration of the colorant. Ink coloring balance is not limited to that of the exemplary ink set in FIG. 5, and may be established appropriately depending on ink type and picture quality of the printed image.

Printer 20 having the hardware configuration described above advances the printer paper PP by means of the paper feed motor 22 while reciprocating the carriage 30 by means of the carriage motor 24, and actuates the piezo elements of print head 28 to eject drops of ink of each color to produce ink dots and form a multicolor, multitone image on the printer paper PP.

B. Embodiment 1 of Color Separation Process

Figure 6:
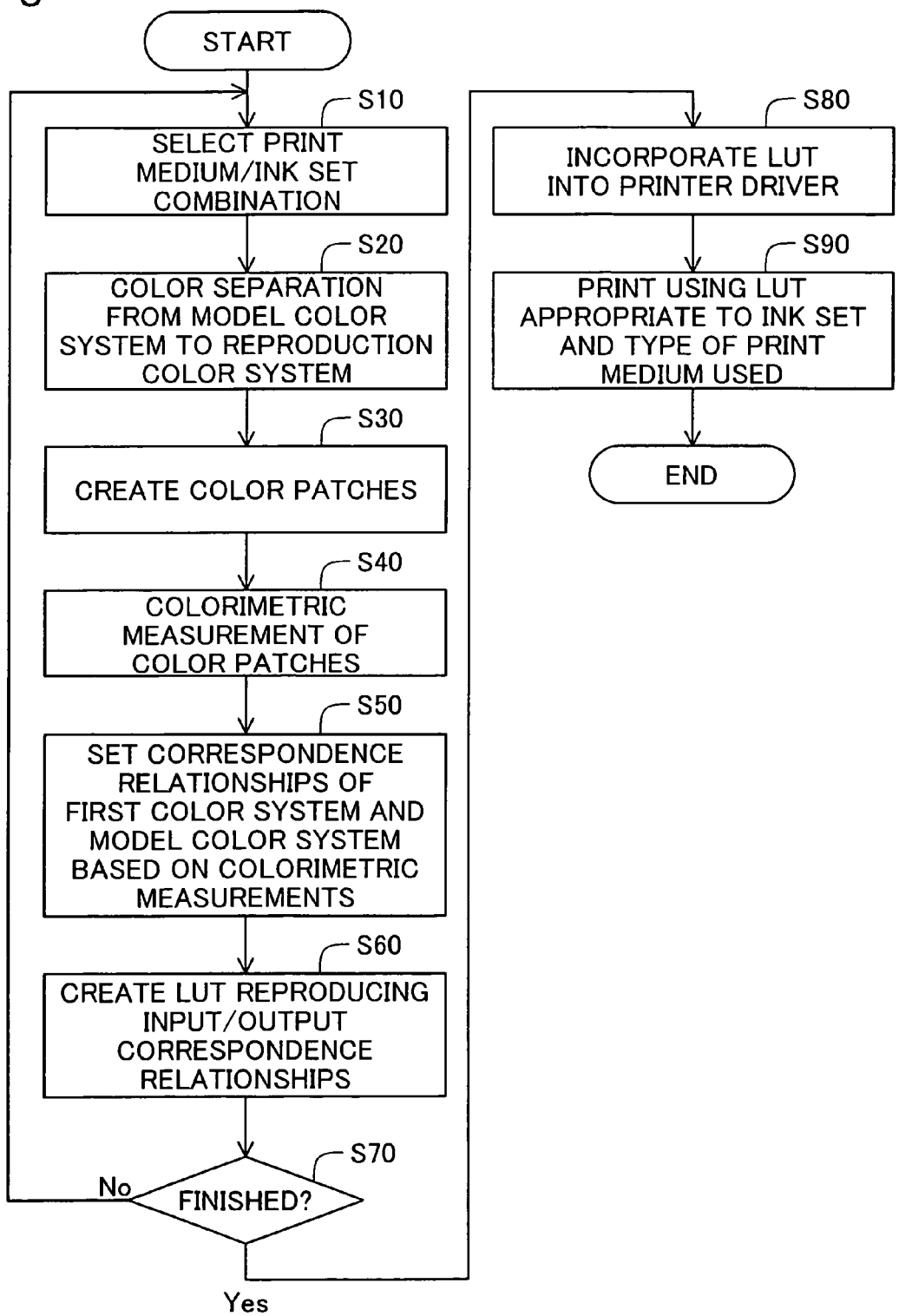
FIG. 6 is a flowchart depicting a color reproduction processing routine.

B1. Method for Creating Color Conversion Lookup Table:

FIG. 6 is a flowchart depicting the color reproduction processing routine in the embodiment. In Steps S10-S70, a color conversion lookup table LUT for color conversion (FIG. 1) is created.

First, in Step S10, one combination of a print medium and an ink set for use in printing is selected. It is assumed that for typical printing, one print medium will be selected by a user from among several types of print media (plain paper, gloss paper, matte paper etc.). In certain types of printer, the ink set to be used can be selected from among a number of types of ink set (for example, a dye ink set and a pigment ink set). Color reproduction of printed matter depends on the print medium and the ink set. Accordingly, in this embodiment, the processes of Steps S10-S60 are executed for each combination of print medium and ink set, and a color conversion lookup table LUT appropriate for each combination is created. The type of print medium and type of ink set assumed to be used in printer 20 are typically displayed on a screen (not shown) for setting the print parameters of the printer driver 96.

In Step S20, a color separation process is executed where a model tone value set represented by a model color system is converted into a second tone value set represented by a reproduction color system. The model color system is represented by tone values of plurality of hypothetical chromatic primary color ink components (in this embodiment, hypothetical Cyan, hypothetical Magenta, and hypothetical Yellow). The reproduction color system is represented by ink quantities of color inks used during printing.

In the model color system, it is assumed that color components have equal coloring. That is, the model color system of this embodiment is a color system for representing colors by tone values of hypothetical chromatic primary color ink components of uniform coloring balance. Accordingly, achromatic color, for example, is represented by a model tone value set in which the ratios of the color component are equal.

In Step S20, first, a plurality of model tone value sets are prepared. As will be discussed later, the plurality of model tone value sets are used for reproducing a plurality of types of color patches. The plurality of model tone value sets are typically provided as color patch data. The color components of these model tone value sets are values representing a range from the minimum possible value (zero) to the maximum value (tone value for reproducing a completely solid area) thereof, in 256 levels from 0 to 255, for example. In this embodiment, a solid area is reproduced by ejecting ink onto all pixels. Thus, tone value when reproducing such a solid area may be assigned a value of 100%.

In preferred practice, the plurality of model tone value sets will be prepared so as to be distributed over the entire color reproduction range or color gamut. More specifically, tone value of the hypothetical color components C, M, Y are preferably distributed over the entire possible range (0%-100%). As a plurality of values for tone value, it would be possible to use the eleven values of 0, 25, 50, 75, 100, 125, 150, 175, 200, 225, and 255, for example. By so doing, it is possible to create a color conversion lookup table LUT affording good accuracy of color conversion for any color. In some instances, apparent change in reproduction color for a change in tone value differs depending on the tone value of the color. In such instances, it is preferable to establish tone values at smaller intervals, the greater the apparent change in color of a tone value range is. By so doing, it is possible to create a color conversion lookup table LUT that is more sensitive to change in apparent color. Color, and in particular hue, of color patches actually reproduced for a model tone value set may vary depending on the coloring of the ink actually used. However, as will be discussed later, in this embodiment, since ink quantity of each color is determined so as to minimize bias in color balance due to in coloring, color patches faithful to a model tone value set can be reproduced.

As color patch data, it would be possible to use color data represented in a different color system (an RGB color system, for example) instead of a model tone value set or color data represented by a model color system. In this case, the model tone value set represented by the model color system would be prepared by converting the color system of the color data.

Next, the plurality of model tone value sets are converted to second tone value sets represented by a reproduction color system. The reproduction color system is represented by ink quantities of the ink set employed at the time of printing, for example, ink quantities for the real chromatic primary color inks CMY. A second tone value set consists of values representing a range of the minimum (0%) to the maximum (100%) possible for CMY color ink quantities, in 256 levels from 0 to 255, for example. A detailed description of the color separation process from the model color system to the reproduction color system will be provided later.

Figure 7:
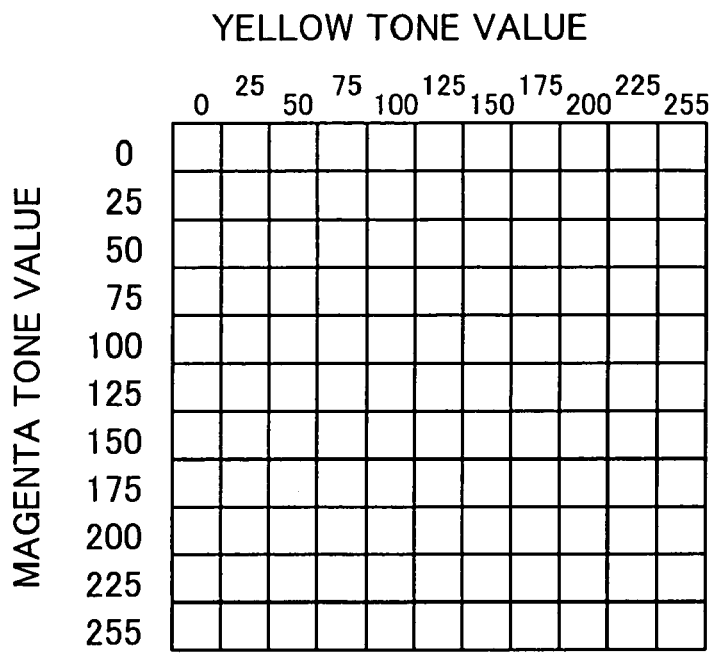
FIG. 7 illustrates color patches.

In Step S30, a plurality of kinds of color patches corresponding to the plurality of model tone value sets are created. FIG. 7 depicts exemplary color patches created in this embodiment. The vertical axis is the tone value of hypothetical magenta ink M in the model tone value sets prepared in Step S20 above; the horizontal axis is hypothetical yellow ink Y tone value. Each color patch is reproduced by ink set ink quantities derived by conversion of tone values according to the color separation process of Step 20. The example of FIG. 7 shows a case in which the tone value for hypothetical cyan ink C in the model tone value sets has been set to zero. In actual practice, a plurality of kinds of color patches corresponding to a plurality of tone values for hypothetical cyan ink C would be created, but are not shown in the drawing. In this way, in Step S30, a plurality of kinds of color patches corresponding to the plurality of model tone value sets prepared in Step S20 are created.

In Step S40 (FIG. 6), using a colorimeter, the plurality of color patches created in Step S30 are subjected to colorimetric measurement. The data obtained as a result of calorimetric measurement is represented in a color system that is independent of any device (i.e., a printer, monitor, etc.), for example, the L*a*b color system or XYZ color system. In this way, by subjecting each color patch to calorimetric measurement in Step S40, it is possible to determine "model/device-independent color system correspondence relationships" between model color systems and device-independent color systems. Also, as a result of colorimetric measurement it is possible to verify the color reproduction range or color gamut of the printer 20, in a device-independent color system.

In Step S50, a correspondence relationship between an arbitrary first color system and a model color system is established on the basis of the "model/device-independent color system correspondence relationships" derived in Step S40. The first color system is the color system of input color image data of the color conversion lookup table LUT; the sRGB color system may be used, for example. "First color system/device-independent color system correspondence relationships" for such a first color system and device-independent color system have been pre-established. Thus, employing this "first color system/device-independent color system correspondence relationships" and the "model/device-independent color system correspondence relationships" derived in Step S40, it is possible to establish correspondence relationships between the first color system and the model color system. The color reproduction range in the first color system and that of the printer may have different portions. In such cases, preferred practice is to effectively utilize the entire gamut of each, by establishing correspondence relationships that have been appropriately expanded or reduced.

Once first correspondence relationships between a first color system and a model color system (Step S50), and a second correspondence relationships between a model color system and a reproduction color system (Step S20), have been established in this way, in Step S60, a color conversion lookup table LUT (FIG. 1) for reproducing the established correspondence relationships is created. The color conversion lookup table LUT in this embodiment has RGB image data as input, and outputs multitone data for the four ink colors shown in FIG. 4. Accordingly, when creating the color conversion lookup table LUT, first, a model tone value set, represented by tone values of hypothetical CMY inks is calculated from tone values of the RGB image data. Next, a second tone value set, i.e., ink quantity for each real ink is determined according to this model tone value set by means of a color separation process, which will be described later. Correspondence relationships having RGB image data values as input, and ink quantities of the real inks as output, are then stored in the color conversion lookup table LUT.

In Step S70 in FIG. 6, a decision is made as to whether the processes of Steps S10-S60 have been completed for all combinations of ink set and print medium assumed to be used by printer 20. In the event that not all processing has been completed, the processes of Steps S10-S60 are repeated; if completed, the system moves to the next Step S80.

In Step S80, the plurality of color conversion lookup tables LUT created in this way are incorporated into printer driver 96 (FIG. 1). Printer driver 96 is a computer program for realizing on computer 90 the function of creating print data PD to be sent to printer 20. Color conversion lookup tables LUT are installed together with printer driver 96 on computer 90, as data to which printer driver 96 refers. A printer driver 96 incorporating color conversion lookup tables LUT is typically provided by the manufacturer of the printer 20.

In Step S90 in FIG. 6, the user executes printing using printer 20. At this time, a lookup table suitable for the particular combination of print medium and ink set used for actual printing is selected from among the color conversion lookup tables LUT for all combinations of print media and ink sets, and printing is executed. The combination of print medium and ink set used for actual printing is selected by the user, from a screen (not shown) for setting print parameters of printer driver 96.

B2: Color Separation Process in Embodiment 1

Figure 8:
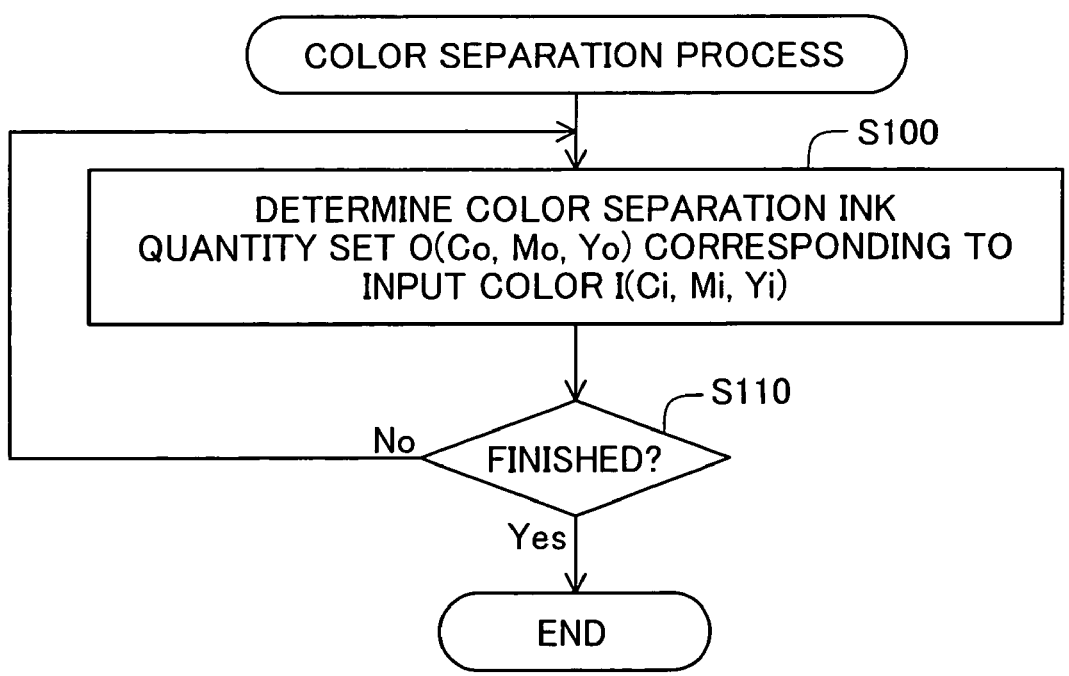
FIG. 8 is a flowchart depicting a color separation processing routine.

FIG. 8 is a flowchart depicting a processing routine for a color separation process. In this color separation process, a process to convert from a model color system to a reproduction color system is executed. In Step S100, a color separation ink set O(Co, Mo, Yo) for real inks is calculated from an input color I(Ci, Mi, Yi) represented in the model color system for hypothetical inks.

Figure 9A:
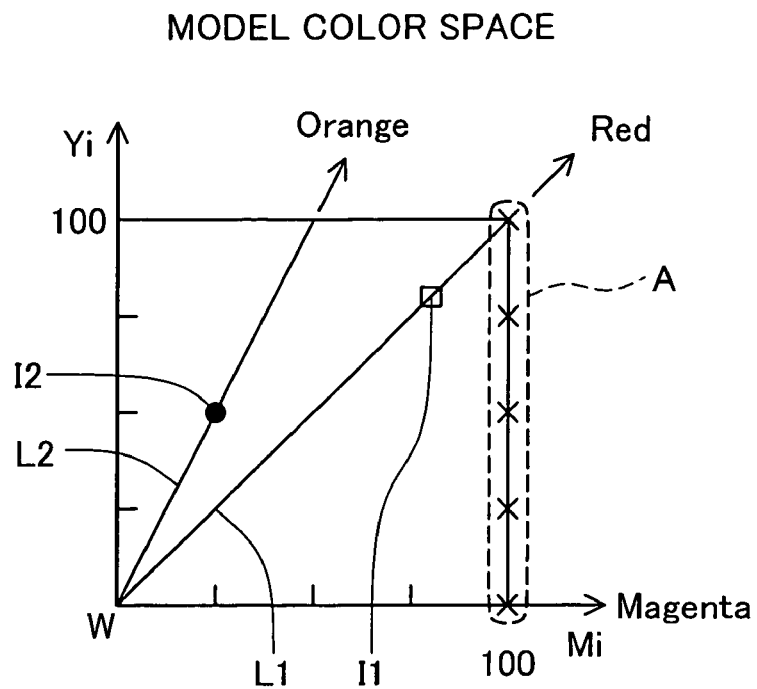
FIGS. 9(a) and 9(b) illustrate the principle of calculating a color separation ink quantity set.

FIG. 9(a) illustrates a model color space represented with color tone values of the model color system as base vectors. In the example of FIG. 9(a), in order to simplify the description, the model color space is illustrated using only two hypothetical color components, namely, hypothetical magenta M and hypothetical yellow Y. The horizontal axis gives tone value $Mi$ of the hypothetical magenta component, and the vertical axis gives tone value $Yi$ of the hypothetical yellow component. A single input color represented by the model color system, or a model tone value set, is represented as a single point in an area of the model color space represented by color component tone values of 0% to 100%.

In the model color space, uniform coloring of the color components is assumed. Accordingly, input color I1 of red hue is represented on a line L1 such that M:Y=1:1. On line L2 such that M:Y=1:0.5, there is represented an input color I2 that is orange with greater intensity of yellow as compared to the red hue. In this way, in the model color space, the ratio of the tone values of a color can be used as index of hue.

Figure 9B:
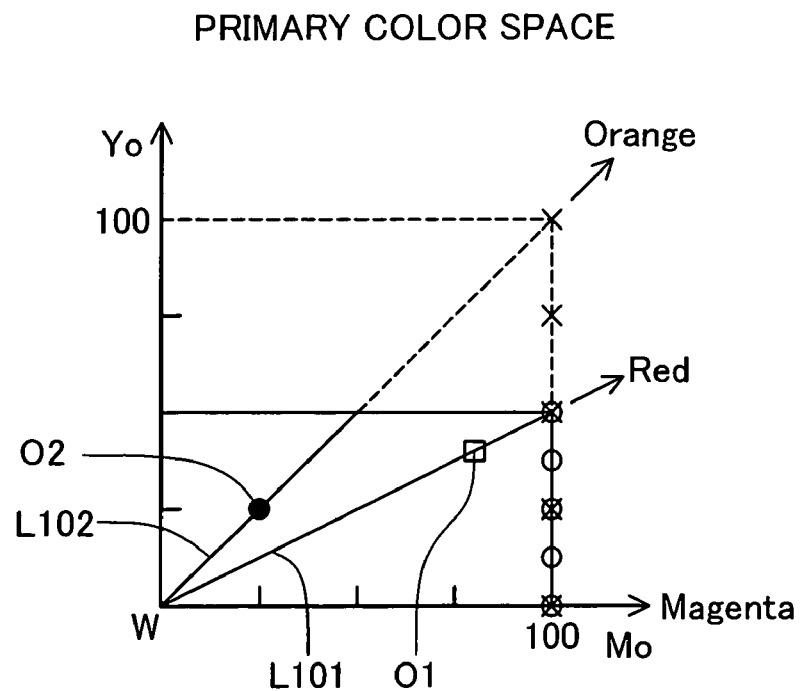

FIG. 9(b) illustrates a primary color space represented with ink quantities of chromatic primary color inks of the real ink set as base vectors. In the example of FIG. 9(b), in order to simplify the description, the color space is illustrated using only two real color components, namely, real magenta M and real yellow Y. The horizontal axis gives ink quantity Mo of the magenta component, and the vertical axis gives ink quantity Yo of the yellow component. A combination of ink quantities of the real ink set, or a color separation ink quantity set, is represented as a single point in an area of the primary color space represented by color component tone values of 0% to 100%.

Here, balance of the actual chromatic primary color inks is not assumed to be uniform; rather, ink quantity ratio when achromatic color is reproduced by a color mixture is assumed to be C:M:Y=1:1:0.5. That is, the primary color mixture ratio C:M:Y=1:1:0.5. On this basis, a color separation ink quantity set O2 represented by a point on line L102 such that ratios of magenta ink M and yellow ink Y are equal (M:Y=1:1) will reproduce an orange color whose hue is more biased towards yellow, as compared to red. A color separation ink quantity set O1 represented by a point on line L101 such that the ratio of yellow ink Y is half that of magenta ink M (M:Y=1:0.5) will reproduce a red color. In this way, in the primary color space, the ratio of ink quantities of colors can be used as an index representing hue.

In this embodiment, correspondence relationships between an input color I(Ci, Mi, Yi) and a color separation ink quantity set O(Co, Mo, Yo) can be established based on the following equations.

$$Co = kc \times Ci \quad (1a)$$

$$Mo = km \times Mi \quad (1b)$$

$$Yo = ky \times Yi \quad (1c)$$

In Equations (1a)-(1c), kc, km and ky are primary coloring factors established for the chromatic primary color inks C, M, Y. In this embodiment, the primary coloring factors are proportional to the primary color mixture ratios while its maximum is assigned a value of 1. In the example in FIGS. 9(a) and 9(b), the primary coloring factors kc, km, ky are set at 1.0, 1.0, 0.5, for convenient of illustration. Color separation ink quantities (Co, Mo, Yo) for each color are values derived by multiplying the tone values (Ci, Mi, Yi) for each input color by the primary coloring factors (kc, km, ky). As a result, the color separation ink quantity set O1 on line L101 reproducing red color in FIG. 9(b) is associated with input color I1 on line L1 that represents red color; and, the color separation ink quantity set O2 on line L102 reproducing orange color in FIG. 9(b) is associated with input color I1 on line L2 that represents orange color. With regard to the other colors as well, correspondence relationships between input color I and color separation ink quantity set O are established in similar fashion. As a result, color balance of color produced by a color separation ink quantity set can be prevented from becoming too much biased to ink having strong coloring.

Bias occurring in the color balance of color produced by a color separation ink quantity set can in some instances produce large differences in hue among a plurality of color patches of different hue, so that the accuracy of color conversion declines. For example, in the example in FIGS. 9(a) and 9(b), assume that color separation ink quantities (Co, Mo, Yo) is set to the same values as the input color tone values (Ci, Mi, Yi), without any consideration of the balance of coloring of each ink. Area A in FIG. 9(a) is a color reproduction area of high saturation and transition in hue from magenta to red; specifically, it is an area in which the tone value Mi for magenta is at maximum (100%), with the tone value Yi for yellow from 0 to 100%. Five input colors, each indicated by an "X", having yellow tone values Yi of "0, 25, 50, 75 and 100%" are prepared. Here, where values which are the same as the input color tone values (Ci, Mi, Yi) are used as color separation ink quantities (Co, Mo, Yo), the number of color patches indicated by "X" in the hue transition from magenta to red declines to three, as shown in FIG. 9(b). As a result, there is a possibility that accuracy of color conversion will be lower in this area.

In this embodiment, color separation ink quantities (Co, Mo, Yo) for real inks are established with consideration of the balance of coloring of the real CMY inks, based on the Equations (1a)-(1c) hereinabove. As a result, as shown in FIG. 9(b), five color patches, each represented by an open circle, are reproduced in a hue transition area from magenta to red, thereby attaining higher accuracy of color conversion.

In this way, by determining the color separation ink quantity set with consideration given to differences in coloring, bias in the color balance of reproduced color can be avoided, even in cases where the balance of coloring of the real inks is not uniform. Poor color conversion in some color reproduction areas can be prevented accordingly.

Figure 10A:
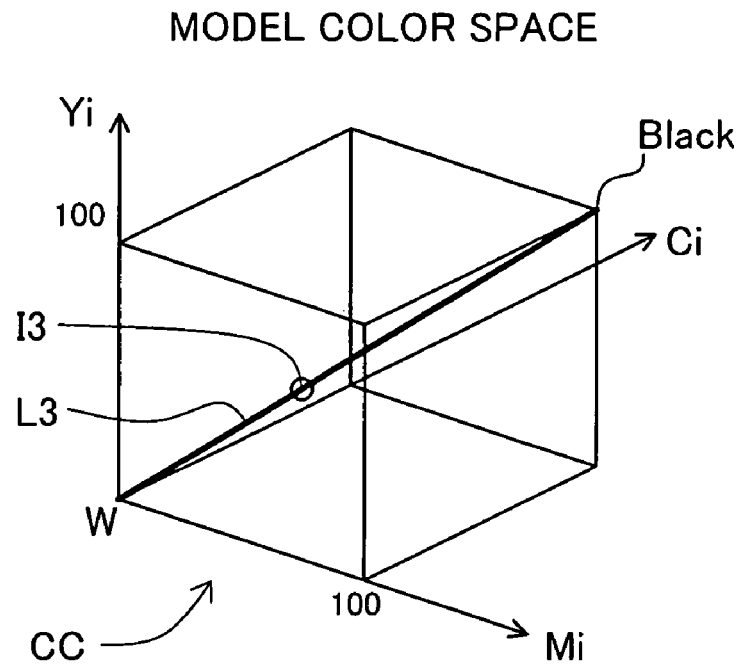
FIGS. 10(a) and 10(b) illustrate the principle of calculating a color separation ink quantity set.

In the preceding description, two color components M, Y are used for reproduction; however, the concept is the same where three color components C, M, Y are used. FIG. 10(a) depicts a model color space represented using the three color components C, M, Y. Colors represented in the model color space take the form of points in a cube represented by CMY tone values of 0-100% in the model color space. Hereinafter, the cube shall be termed color solid CC. In this model color space, as in the model color space of FIG. 9(a), uniform balance of coloring of color components is assumed. Accordingly, input color I3 representing achromatic color is represented on a line L3 such that C:M:Y=1:1:1.

Figure 10B:
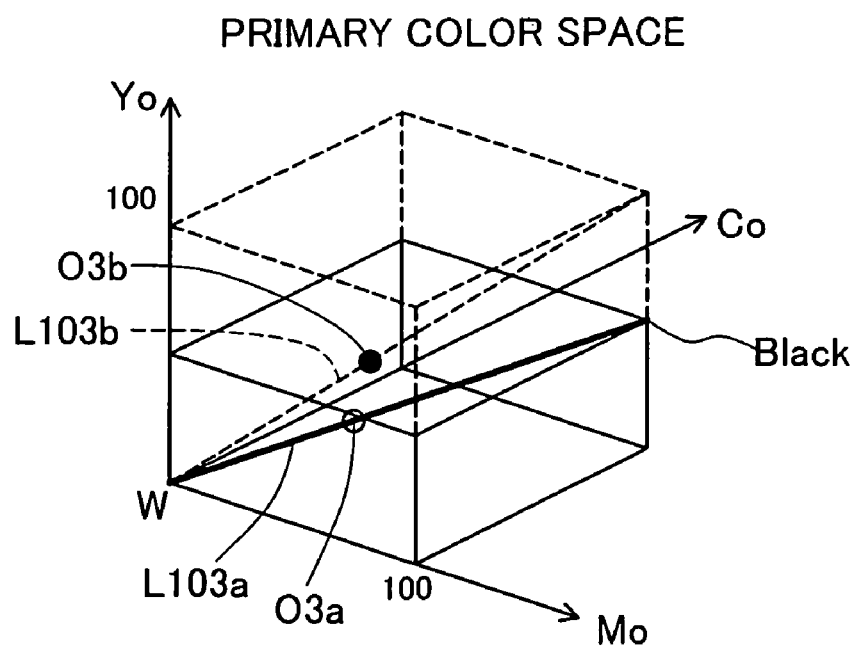

FIG. 10(b) depicts a primary color space represented using three real color components C, M, Y. With regard to primary color mixture ratio, C:M:Y=1:1:0.5. Accordingly, color separation ink quantity set O3b represented by a point on a line L103b representing equal ratios for each ink quantity (C:M:Y=1:1:1) will reproduce a color that is biased towards yellow away from achromatic color. Color separation ink quantity set O3a represented by a point on a line L103a representing a ratio of yellow that is half that of the other inks C, M (C:M:Y=1:1:0.5) will reproduce achromatic color.

In this embodiment, a color separation ink quantity set O(Co, Mo, Yo) associated with an input color I(Ci, Mi, Yi) is determined on the basis of primary coloring factors (kc, km, ky) as indicated by the above Equations (1a)-(1c). Accordingly, the color separation ink quantity set O3a on line L103a representing achromatic color in FIG. 10(b) is associated with the input color I3 on line L3 representing achromatic color in FIG. 10(a). As a result, since bias in color balance of color patches close to achromatic color can be reduced, decline in accuracy of color conversion of colors close to achromatic color can be reduced.

With regard to colors for which change in color appearance (particularly change in hue) relative to change in input color tone value is appreciable, in some instances, a plurality of input colors for reproducing close colors may be prepared in order to improve accuracy of color conversion. In this embodiment, with regard to an arbitrary color, correspondence relationships between input color I for hypothetical inks and the color separation ink quantity set O for real inks are established based on the primary coloring factors. As a result, bias in color balance of reproduced color patches can be reduced, so that even if there is bias in ink coloring of real inks, the accuracy of color conversion may be improved.

In Step S110 in FIG. 8, a decision is made as to whether color separation ink quantity sets have been calculated for all input colors. In the event that calculation of all color separation ink quantity sets has not been completed, the process of Step S100 is repeated; if completed, the process terminates.

In the embodiment hereinabove, the primary coloring factors are set proportional to the primary color mixture ratios, and a color separation ink quantity set is determined in such a way that the ratios of the ink quantities in the real primary color space are given by multiplying the tone values of the colors in the model color space by the primary coloring factors. By so doing, even in instances of non-uniform balance of coloring of the plurality of real chromatic primary color inks used, the color balance of color reproduced by the color separation ink quantity set can be prevented from becoming biased towards the color of ink having strong coloring, as compared to the color represented by the input color. In particular, for input color representing achromatic color, it is possible to avoid in the actually reproduced color appreciable bias towards the color of an ink having strong coloring, thus making it possible to create a color conversion lookup table having good accuracy vis-à-vis human color perception. Additionally, by reducing bias in color balance of reproduced color, high accuracy of color conversion can be attained.

C. Embodiment 2 of Color Separation Process

Figure 11:
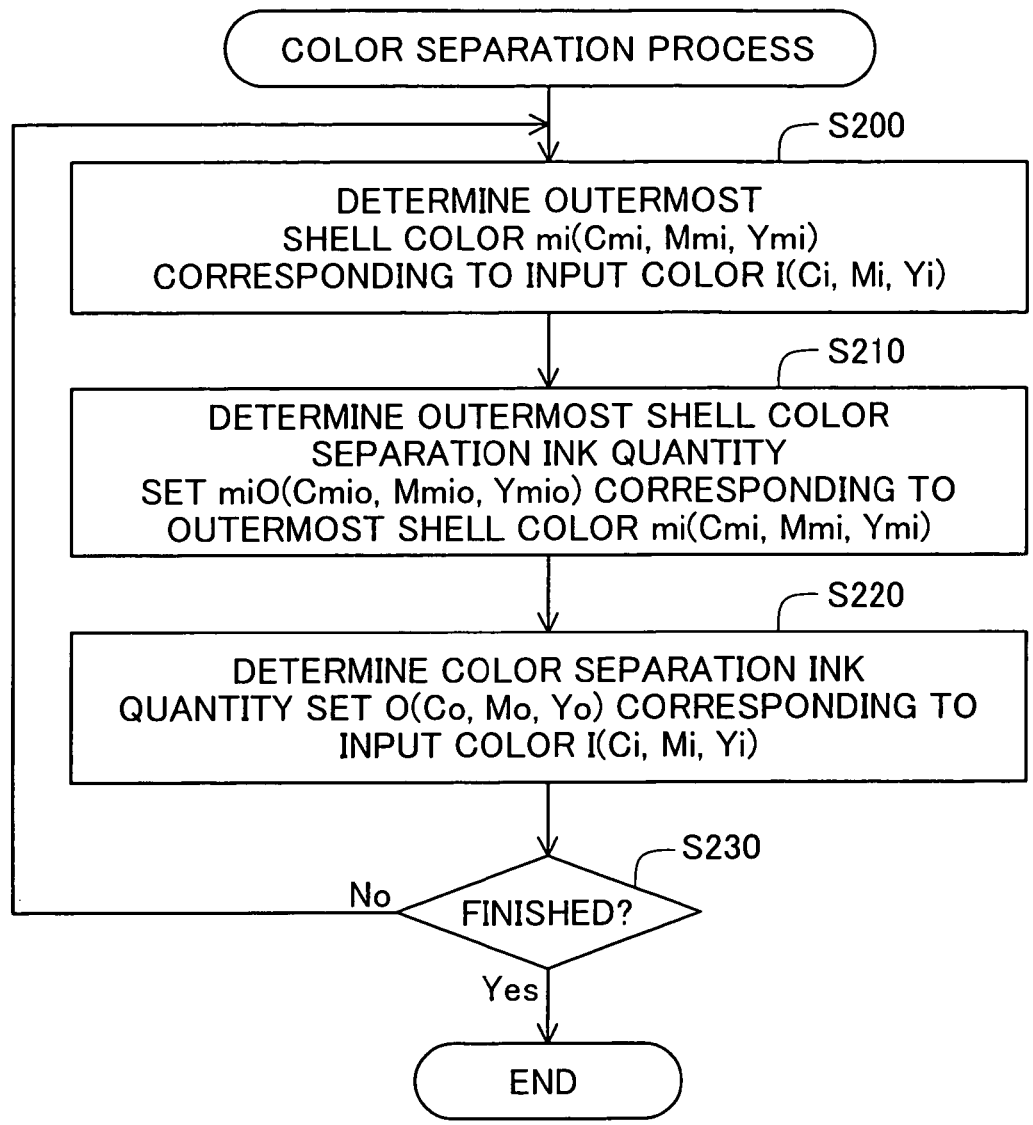
FIG. 11 is a flowchart depicting a color separation processing routine.

FIG. 11 is a flowchart depicting a processing routine in a second embodiment of the color separation process. A difference from FIG. 8 is that processes to determine outermost shell color mi and outermost shell color separation ink quantity set miO (S200, S210) are executed, and color separation ink quantity set O is then determined on the basis of outermost shell color mi and outermost shell color separation ink quantity set miO.

Figure 12A:
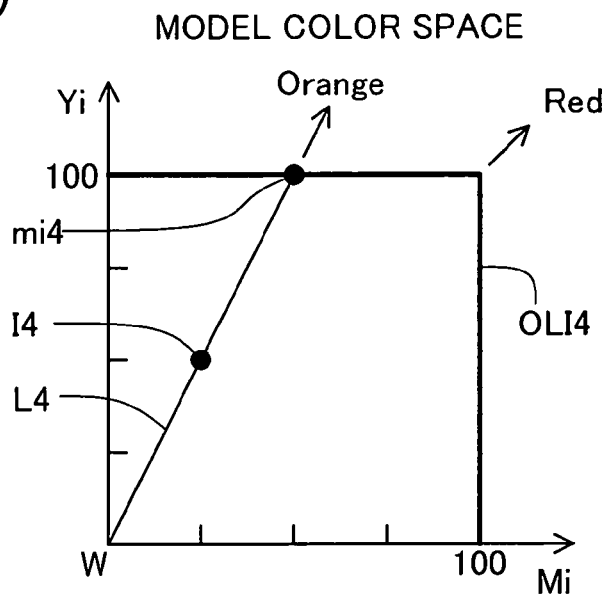
FIGS. 12(a) through 12(c) illustrate principle of calculating a color separation ink quantity set.

In Step S200 in FIG. 11, outermost shell color mi for input color I is determined. FIG. 12(a) illustrates the gist of determining outermost shell color mi. FIG. 12(a) depicts a model color space analogous to that of FIG. 9(a). An input color I4 is established in the model color space of FIG. 12(a). Line L4 is a line on which ratios of the two color components M, Y are the same as in input color I4. The outermost shell line OLI4 of the area of possible values for color components Mi, Yi is indicated by a heavy line.

Outermost shell color mi has the same vector direction as input color I in the model color space, and is established as a color located on the outermost shell of the model color space. In the example of FIG. 12(a), outermost shell color mi4 associated with input color I4 is established as the intersection point of outermost shell line OLI4 with a line L4 passing through the origin W and input color I4.

Figure 12B:
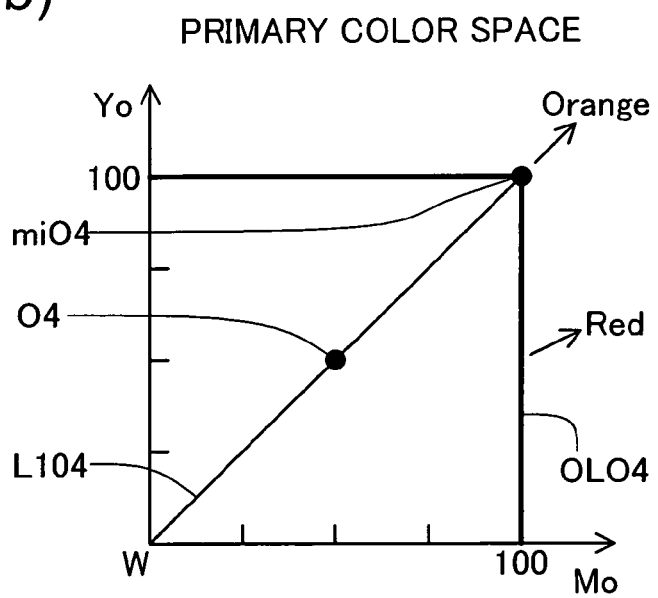

In Step S210 in FIG. 11, an outermost shell color separation ink quantity set miO corresponding to outermost shell color mi is determined. FIG. 12(b) illustrates the gist of determining outermost shell color separation ink quantity set miO. FIG. 12(b) depicts a primary color space analogous to that of FIG. 9(b). Line L104 is a line on which the ratio of magenta ink M and yellow ink Y ink quantities is equal to the ratio of the color components of outermost shell color mi4, multiplied by primary coloring factors. Accordingly, the color separation ink quantity set on line L104 can reproduce substantially the same hue as color on line L4 in FIG. 12(a). Outermost shell color separation ink quantity set miO4 is established on such a line L104. In the example of FIG. 12(b), outermost shell color separation ink quantity set miO4 is established on line L104, on an outermost shell line OLO4 of the area of possible values for ink quantities Mo, Yo.

Figure 12C:
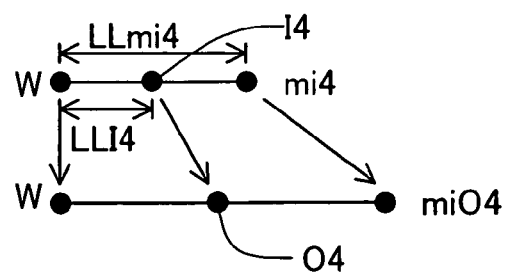

In Step S220 in FIG. 11, a color separation ink quantity set O corresponding to input color I is established. FIG. 12(c) illustrates the gist of the relationship between input color I4 and a color separation ink quantity set O4 shown in FIGS. 12(a) and 12(b). In this embodiment, the color separation ink quantity set O4 is obtained by multiplying the outermost shell color separation ink quantity set mO4 by a ratio of LLI4/LLmi4 where LLI4 is the length of the vector indicating the input color I4 and LLmi4 is the length of the vector indicating the outermost shell color mi4. Here, color separation ink quantity set O4 is represented by a point on line LI04 in the primary color space of FIG. 12(b). The outermost shell color mi4 is mapped to the outermost shell color separation ink quantity set miO4 accordingly.

Figure 13A:
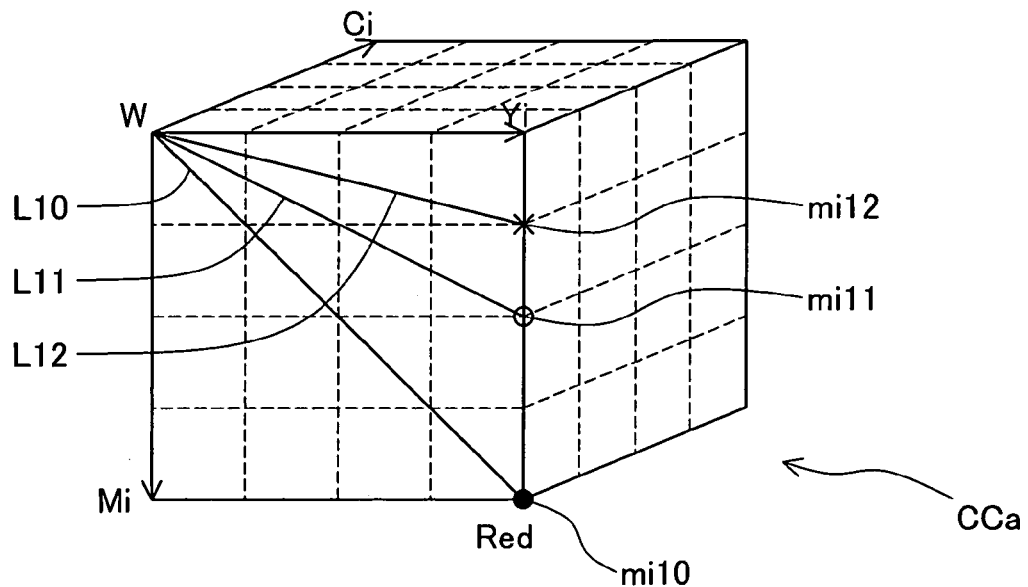
FIGS. 13(a) and 13(b) illustrate the principle of calculating a color separation ink quantity set.

The color separation ink quantity set calculation process described above (FIG. 11: Steps S200-S220) is performed for various input colors I. The process may be executed similarly when the input color includes three color components C, M, Y. FIG. 13(a) depicts a color solid CCa represented by tone values of 0-100% for the three color components CMY in the model color space. Input color is represented as a point inside this color solid CCa. Three outermost shell colors mi10, mi11, mi12 are indicated in the color solid CCa of FIG. 13(a). Also shown are a line L10 passing through the origin W and input color mi10; a line L11 passing through the origin W and input color mi11; and a line L12 passing through the origin W and input color mi12.

Figure 13B:
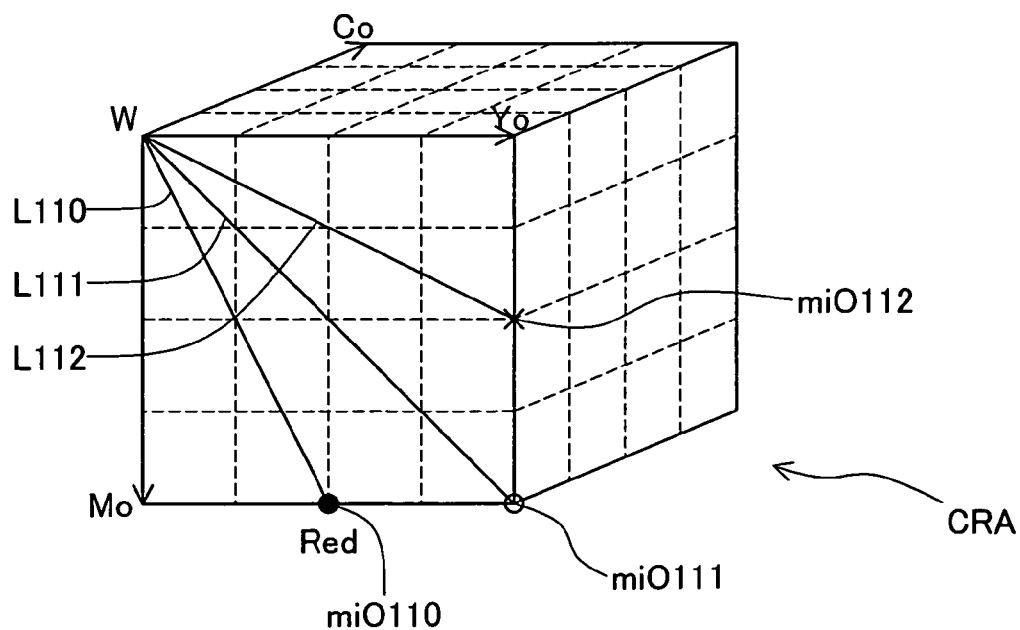

FIG. 13(b) shows a color reproduction area CRA represented by ink quantities of 0-100% for the three color components C, M, Y in the real primary color space. The color separation ink quantity set is represented as a point inside this color reproduction area CRA. On the outer shell of the color reproduction area CRA of FIG. 13(b) are shown three outermost shell color separation ink quantity sets miO110, miO111, and miO112. Also shown are a line L110 passing through the origin W and outermost shell color separation ink quantity set miO110; a line L111 passing through the origin W and outermost shell color separation ink quantity set miO111; and a line L112 passing through the origin W and outermost shell color separation ink quantity set miO112.

Here, the outermost shell color separation ink quantity set miO110 is established such that the ratio of C, M, Y is equal to the values obtained by multiplying the ratio of the color components of outermost shell color mi10 shown in FIG. 13(a) by the primary coloring factors. Similarly, outermost shell color separation ink quantity set miO111 is established on the basis of outermost shell color mi11, and outermost shell color separation ink quantity set miO112 on the basis of outermost shell color mi12. Accordingly, in the example of FIGS. 13(a) and 13(b), a color separation ink quantity set on line L110 is associated with an input color on line L10 representing substantially identical hue; a color separation ink quantity set on line L111 is associated with an input color on line L11 representing substantially identical hue; and a color separation ink quantity set on line L112 is associated with an input color on line L12 representing substantially identical hue.

In the example of FIGS. 13(a) and 13(b), the description uses outermost shell colors mi10-mi12 located on the Ci=0% plane in color solid CCa; however, color separation ink quantity sets based on primary coloring factors are determined analogously for input colors located on in any direction in the model color space.

In the embodiment described hereinabove, the outermost shell color separation ink quantity set miO associated with an outermost shell color mi is determined so as to be situated on the outermost shell of the reproduction area of color reproducible by the ink set. In other words, outermost shell color separation ink quantity set miO meets the following condition:

(ii) a vector length of the outermost shell color separation ink quantity set miO represented by the primary color space is the greatest length within the range reproducible by the ink set. As a result, a color separation ink quantity set at an outermost shell location in the primary color space is associated with a color at an outermost shell location (outermost shell color) in the model color space. Also, a color separation ink quantity set in the interior of the outer shell of the primary color space is associated with a color in the interior of the outer shell of the model color space. Accordingly, the entire color reproduction range in the model color space is mapped onto the entire color reproduction range in the primary color space, whereby it is possible to create a color conversion lookup table that effectively utilizes the color reproduction range reproducible by the ink set.

Here, ratios of the color components of outermost shell color mi are the same as ratios of the color components of input color I. Ratios of ink quantities in the outermost shell color separation ink quantity set miO associated with outermost shell color mi are equal to tone values of outermost shell color mi, multiplied by the primary coloring factors. Ratios of ink quantities of the color separation ink quantity set O associated with an input color I are the same as the ratios of ink quantities of the outermost shell color separation ink quantity set miO. Accordingly, ratios of ink quantities of the color separation ink quantity set O are equal to the tone values of input color I, multiplied by the primary coloring factors. By so doing, even in instances of non-uniform balance of coloring of the plurality of real chromatic primary color inks, the color balance of color reproduced by the color separation ink quantity set can be prevented from becoming biased towards the color of ink having strong coloring, as compared to the color represented by the input color. In particular, bias in the color balance of color patches close to achromatic color can be reduced, so that high accuracy of color conversion of color close to achromatic color can be attained. As a result, it becomes possible to create a color conversion lookup table having good accuracy vis-à-vis human color perception.

D. Embodiment 3 of Color Separation Process

Figure 14:
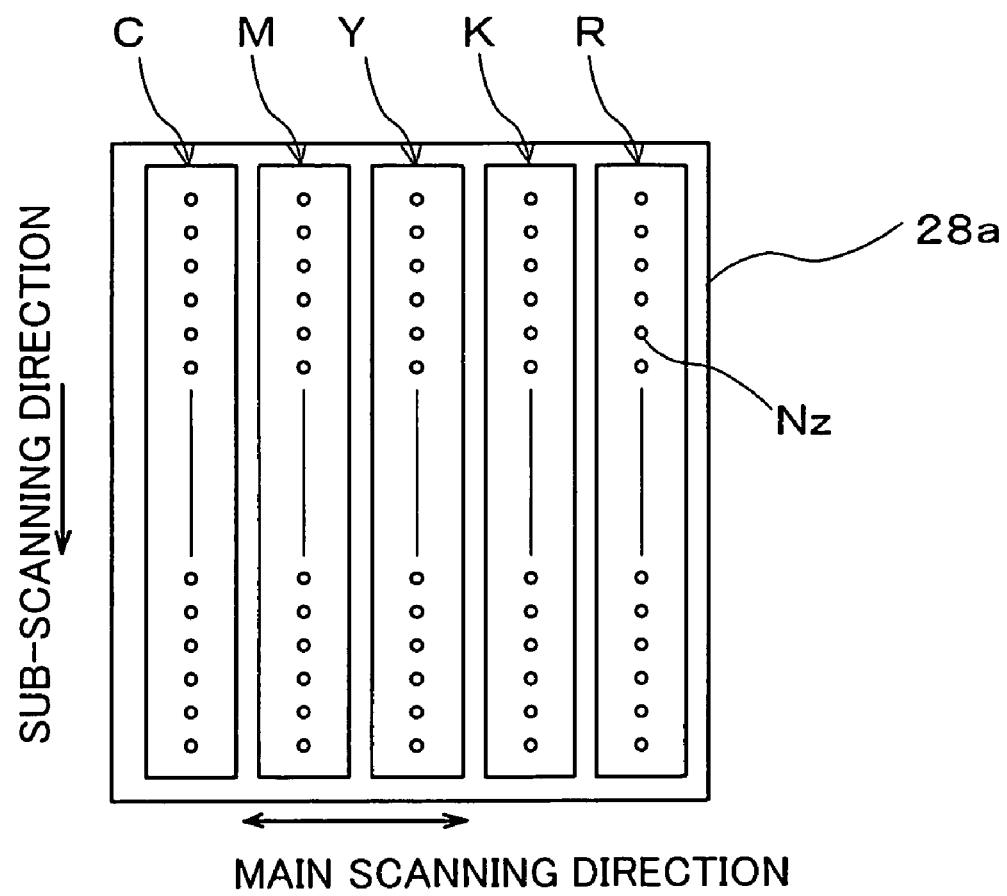

FIG. 14 illustrates an array of nozzles Nz on the bottom face of print head 28a in Embodiment 3. A difference from the example shown in FIG. 4 is that it is possible to use red ink R as a spot ink or a chromatic secondary color ink having a hue between magenta ink M and yellow ink Y. The red ink R may be prepared by mixing colorants for magenta ink M and yellow ink Y. Alternatively, colorant having a hue between magenta ink M and yellow ink Y, such as Pigment Red 177 or Pigment Orange 43, may be used.

Figure 15:
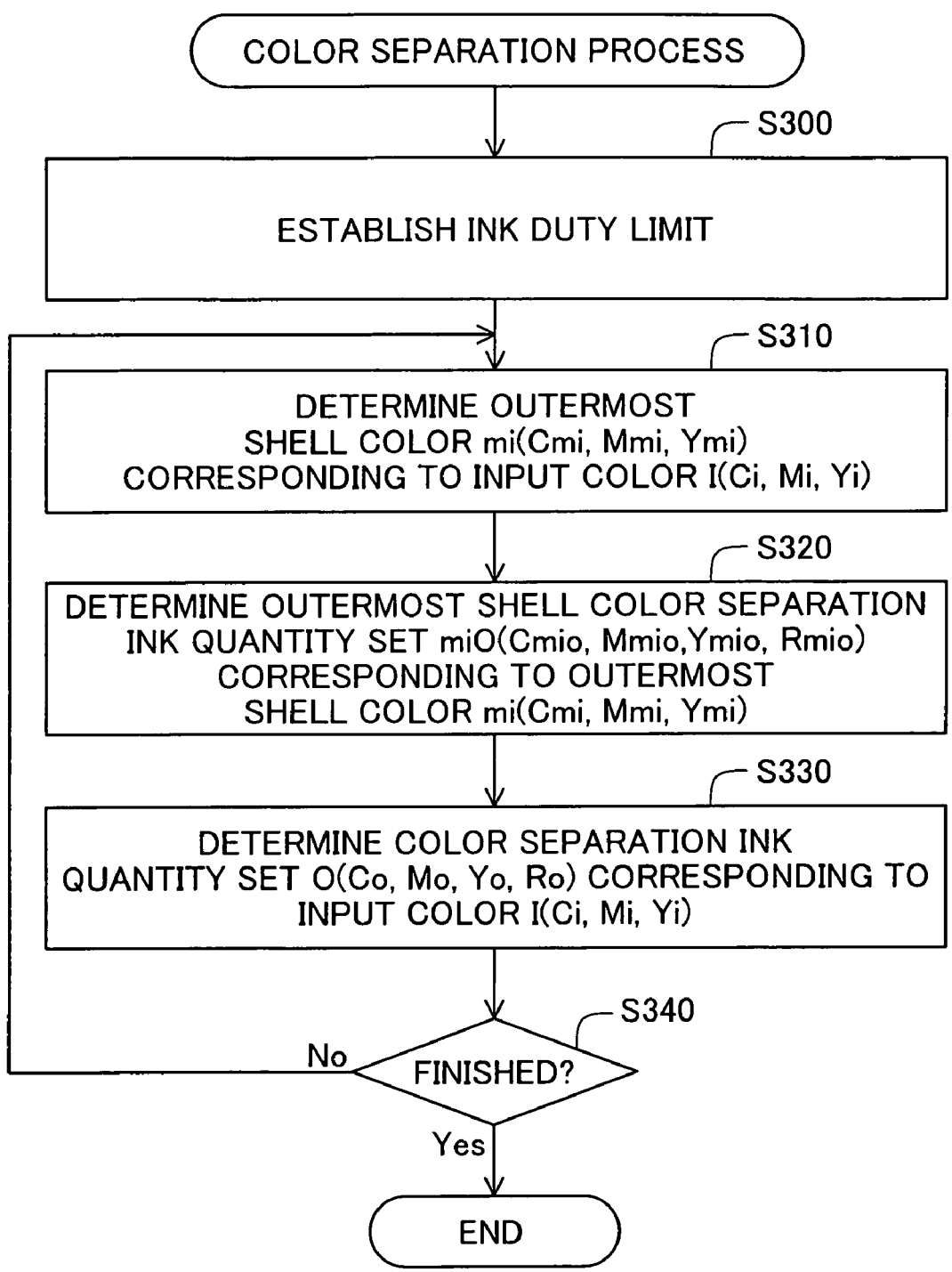
FIG. 15 is a flowchart depicting a color separation processing routine.

FIG. 15 is a flowchart depicting the processing routine of the color separation process in Embodiment 3. There are two points of difference from the color separation process shown in FIG. 11. The first difference is that red ink is included in the real ink set. The second difference is that there is established an ink duty limit which limits ink quantities of the color separation ink quantity set.

In Step S300 of FIG. 12, there is established an ink duty limit which limits ink quantity of each color of the real ink set. Ink duty limit refers to a limit relating to ink quantity useable per unit of area of a print medium. This ink duty limit is established with reference to type of ink and print medium. An ink duty limit may include ink-by-ink limits, limits as to total ink quantity for two ink mixture, limits as to total ink quantity for all inks, or the like.

A limit as to the total ink quantity of all inks may be given by the following equation, for example.

$$C+M+Y+R \leq \text{Duty\_T} \quad (2)$$

In Equation (2), C, M, Y, and R respectively represent ink quantities of the real color inks C, M, Y, R (this convention is also used in other equations hereinbelow). Duty_T is a limit value that has been preset with reference to type of ink and print medium.

Limits as to ink quantities of individual color inks may be given by the following equations, for example.

$$C \leq \text{Duty\_C} \quad (3a)$$

$$M \leq \text{Duty\_M} \quad (3b)$$

$$Y \leq \text{Duty\_Y} \quad (3c)$$

$$R \leq \text{Duty\_R} \quad (3d)$$

Duty_C-Duty_R are limit values preset for each color, depending on the type of ink and print medium.

Limits as to ink quantities for color mixtures of two color inks may be given by the following equations, for example.

$$C+M \leq \text{Duty\_CM} \quad (4a)$$

$$C+Y \leq \text{Duty\_CY} \quad (4b)$$

$$C+R \leq \text{Duty\_CR} \quad (4c)$$

$$M+Y \leq \text{Duty\_MY} \quad (4d)$$

$$M+R \leq \text{Duty\_MR} \quad (4e)$$

While these limits are imposed for combinations of any two inks, examples are given for five of these combinations. Duty_CM-Duty_MR are limit values preset for combinations of inks, with reference to type of ink and print medium.

As ink duty limits, there may also be established limits regarding combinations of any kinds of ink mixtures, such as mixtures of three color inks, color mixtures of four color inks, etc.

Figure 16A:
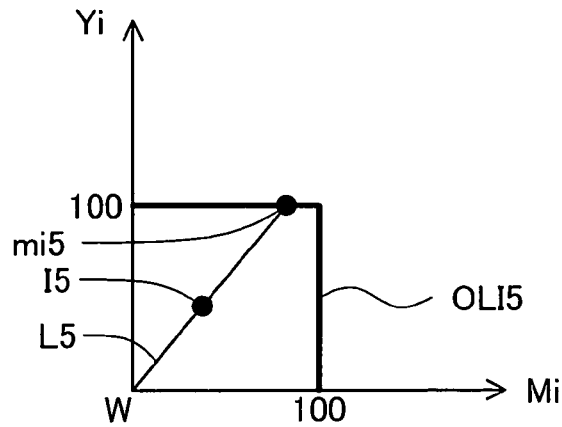
FIGS. 16(a) through 16(c) illustrate the principle of calculating a color separation ink quantity set.

In Step S310 of FIG. 15, an outermost shell color mi corresponding to an input color is determined. FIG. 16(a) illustrates the gist of determining the outermost shell color mi. FIG. 16(a) depicts a model color space analogous to that of FIG. 12(a). An input color I5 is established in the model color space of FIG. 16(a). Line L5 is a line on which ratios of the two color components M, Y are the same as in the input color I5. The outermost shell line OLI5 of the area of possible values for color components Mi, Yi is indicated by a heavy line. In the example of FIG. 16(a), as in the example of FIG. 12(a), an outermost shell color mi5 associated with input color I5 is established as the intersection point of outermost shell line OLI5 with a line L5 passing through the origin W and input color I5.

Figure 16B:
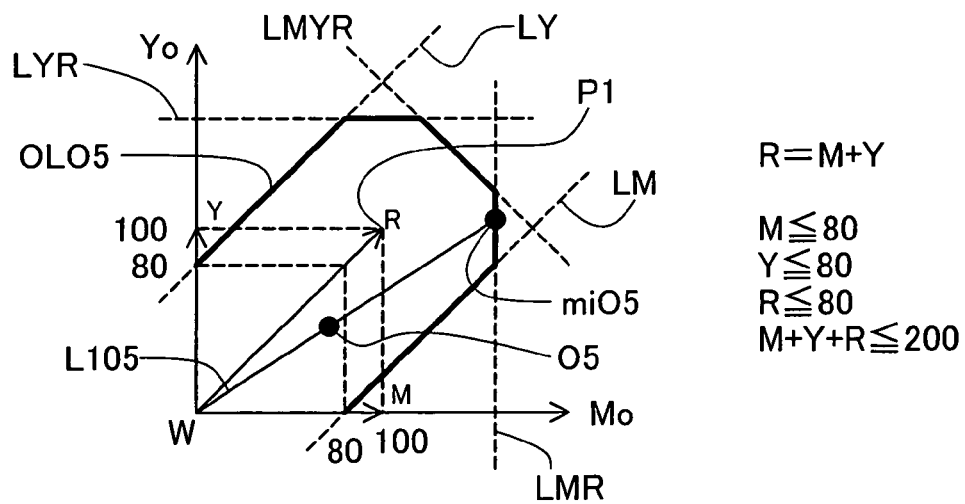

In the next Step S320, an outermost shell color separation ink quantity set miO corresponding to the outermost shell color mi is determined. FIG. 16(b) illustrates the gist of calculating the outermost shell color separation ink quantity set miO. FIG. 16(b) depicts a primary color space analogous to that of FIG. 12(b). A difference from FIG. 12(b) is that, due to the use of red ink R, the color reproduction area is extended.

Here, it is assumed that a 1:1 mixture of magenta ink M and yellow ink Y can reproduce hue and saturation substantially identical to an equal ink quantity of red ink R. It is defined that a term "substitution ink quantities" means ink quantities of chromatic primary color inks in the color mixture which reproduces substantially the same color with that reproduced by the spot color ink with the unit ink amount of 1. Substitution ink quantity can be thought of as an index of intensity of coloring of spot color ink, expressed in terms of chromatic primary color ink amounts. Such substitution ink quantities can be derived through calorimetric measurement and comparison of color patches produced with mixtures of chromatic primary color inks, and color patches produced with spot color ink.

In this example, since it is possible for a 1:1 mixture of magenta ink M and yellow ink Y to reproduce hue and saturation substantially identical to an equal ink quantity of red ink R, substitution ink quantity for both magenta ink M and yellow ink Y is 1 with respect to red ink R. Here, it is possible to reproduce substantially identical hue and saturation, by substituting M and Y inks with red ink R based on substitution ink quantities. For example, color P1 in FIG. 16(b) is the color reproducible when ink quantities of the colors M, Y are each 100%. It is possible to reproduce substantially the same color by substituting an ink quantity of red ink R for ink quantity of each of the colors M, Y. For example, even if only the ink quantity of red ink R is 100% i.e., red ink R ink quantity is substituted for ink quantity of both M and Y inks, it is nevertheless possible to reproduce substantially the same color. Here, the ink quantity obtained by substituting ink quantities of chromatic primary color inks M, Y for all ink quantities of spot color ink R (in this example, M=100%, Y=100%) can be used as a hypothetical ink quantity for representing, in a primary color space, color reproducible using the three colors M, Y, R.

As in the present example, where it is possible to substitute a mixture of chromatic primary color inks M, Y with a spot color ink R in an amount smaller than the sum of the primary color ink quantities, it becomes possible to reproduce substantially identical hue and saturation with a smaller amount of ink. Additionally, by employing a spot color ink in an ink quantity substantially equal to that of a chromatic primary color ink mixture, it is possible to reproduce higher saturation. Thus, even where a limit is imposed on the value of total ink quantity used (i.e., an ink duty limit), by using a spot color ink, it is nevertheless possible to reproduce higher saturation than would be possible when reproduced with a chromatic primary color mixture. Substitution quantities for a spot color ink may be adjusted by manipulating the type and concentration of colorant contained in the spot color ink. Typically, the higher the concentration of colorant in a spot color ink, the higher the substitution quantity will be.

In this example, the following limitations are imposed with regard to ink quantity of each ink.

Condition a: Ink quantity of each ink is 80 or less.

Condition b: The sum of ink quantities of the inks is 200 or less.

Conditions a and b correspond to ink duty limits as described hereinabove. Such ink duty limits are represented in terms of ink quantities of the useable inks of the colors M, Y, R; but may instead by represented in a primary color space using hypothetical ink quantities of the colors M, Y derived using the substitution ink quantities. In this embodiment, ink duty limits are represented by a linear inequality using ink quantities of the colors M, Y, R as shown in FIG. 16(b). Accordingly, ink duty limits are represented by straight lines in the primary color space. Line LM is a line corresponding to M=80%. The reason it is sloped with respect to the M axis is that due to the use of red ink R, hypothetical ink quantities of the colors M, Y can be increased further. Thus, the area fulfilling the condition M≦80% will be inside this line LM. Line LMR is a line corresponding to M+R=160%. This line corresponds to the limit M+R≦160%, derived from the two limits M≦80% and R≦80%. The area fulfilling the condition M+R≦160%, will be inside this line LMR.

In FIG. 16(b) are also shown the following lines, corresponding to the ink duty limits. Line LMYR is a line corresponding to M+Y+R=200; line LYR is a line corresponding to Y+R=160; and line LY is a line corresponding to Y=80.

As a result, colors within areas enclosed by these lines are colors that meet the ink duty limits, and can be reproduced using chromatic primary color inks M, Y and spot color ink R. In the primary color space of FIG. 16(b), outermost shell line OLO5 of such a reproducible area is shown as a heavy line. As regards the condition R≦80, since any color within outermost shell line OLO5 fulfills this condition, the corresponding line is not shown in the drawing. Also shown in FIG. 16(b) is a line L105 at which ratios of magenta ink M and yellow ink Y are equal to the ratio of the color components of the outermost shell color mi5 in FIG. 16(a), multiplied by the primary coloring factors. A color separation ink quantity set on line L105 can reproduce hue substantially identical to that of a color on line L5 in FIG. 16(a). In Step S520 of FIG. 15, an outermost shell color separation ink quantity set miO5 is established on line L105 within an area that meets the ink duty limits. In the example of FIG. 16(b), the outermost shell color separation ink quantity set miO5 is established at the intersection point on line L105, with the outermost shell line OLO5 of the area reproducible using the inks M, Y, R.

The outermost shell color separation ink quantity set described above may be determined analogously in the case where three chromatic primary color inks C, M, Y are used. In a primary color space represented by ink quantities of the three inks C, M, Y, ink duty limits can be represented as planes (not shown), using hypothetical ink quantities for the colors C, M, Y derived using substitution ink quantities. Thus, where hypothetical ink quantities of the colors C, M, Y represented by ink quantities of the colors C, M, Y, R lie within an area enclosed by the planes, the ink quantities can fulfill the ink duty limits. In this embodiment, a color separation ink quantity set situated at the intersection of an outer shell plane meeting ink duty limits and a line at which ratios of the C, M, Y color components are equal to ratios of the color components of outermost shell color mi, multiplied by the primary coloring factors, is employed as outermost shell color separation ink quantity set miO.

Where even more types of ink can be used, the degree of freedom in substituting between chromatic primary color inks and spot color inks increases. Thus, in some instances it may be possible to select combinations of a plurality of types of ink in the range meeting ink duty limits, for the outermost shell color separation ink quantity set miO corresponding to an outermost shell color mi. In this embodiment, in such instances, the combination having the smallest sum of ink quantities may be selected from among a plurality of combinations, for use as outermost shell color separation ink quantity set miO. The outermost shell color separation ink quantity set miO can be determined in similar fashion in cases where a plurality of types of spot color ink are used.

Figure 16C:
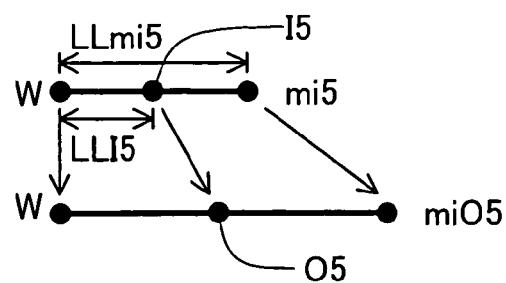

In Step S330 of FIG. 15, a color separation ink quantity set O corresponding to input color I is established. FIG. 16(c) illustrates the gist of the relationship between input color I5 and a color separation ink quantity set O5 shown in FIGS. 16(a) and (b). In this embodiment, as in the example of FIG. 12(c), the color separation ink quantity set O5 is given by multiplying the outermost shell color separation ink quantity set miO5 by a ratio of LLI5/LLmi5 where LLI5 is the length of the vector indicating input color I5 and LLmi5 is the length of the vector indicating the outermost shell color mi5. Accordingly the outermost shell color mi5 is mapped to the outermost shell color separation ink quantity set miO5. Since colors between origin W and outermost shell color separation ink quantity set miO5 can fulfill ink duty limits, they are reproducible with a particular combination of print medium and ink set. Accordingly, it is possible to effectively use colors reproducible with a particular combination of print medium and ink set. By calculating color separation ink quantity set O5 so as to be proportional to length LLI5, the color separation ink quantity set O5 for input color I5 can be calculated easily.

By sequentially executing Steps S310-S330 of FIG. 15, various color separation ink quantity sets O represented by the reproduction color system corresponding to various input colors represented by a primary color system are calculated.

In this embodiment described above, determination of the outermost shell color separation ink quantity set miO is carried out so as to fulfill the following three conditions:

(i) outermost shell color separation ink quantity set miO is within ink duty limits;

(ii) vector length when outermost shell color separation ink quantity set miO is represented in a primary color space is longest within the range reproducible by the ink set; and (iii) total ink mount of the outermost shell color separation ink quantity set miO is the smallest possible.

Even where not all of these conditions are met, color reproduction range can nevertheless be extended if outermost shell color separation ink quantity set miO is established to the outside of the area reproducible using chromatic primary color ink only, that is the area $Mo \leq 80\%$, $Yo \leq 80\%$ in FIG. 16(b). For example, even where condition (ii) is not met, so that the vector representing outermost shell color separation ink quantity set miO is not longest, nevertheless, if outermost shell color separation ink quantity set miO is established to the outside of the area reproducible using chromatic primary color ink only, the color reproduction range can be extended.

As described hereinabove, in this embodiment, when spot color ink can be used, the color separation process is carried out on the basis of hypothetical ink quantity derived by substituting, on the basis of substitution quantities, ink quantity of chromatic primary color ink for ink quantity of spot color ink in the color separation ink quantity set. Accordingly, even where a spot color ink is used, bias in the color balance of reproduced color can be minimized on the basis of primary coloring factors, whereby color conversion lookup tables with good accuracy of color conversion can be created. Additionally, since the color separation ink quantity set is determined so as to meet ink duty limits, high quality printing can be carried out appropriately for particular types of ink or print media.

When the color separation process of this embodiment is implemented in Step S20 of the color conversion lookup table creation process shown in FIG. 6, the second tone value set consists of tone values represented by ink quantities for the chromatic primary color inks C, M, Y and the spot color ink R. Thus, in Step S30, color patches represented using the colors C, M, Y, R are reproduced.

E. Embodiment 4 of Color Separation Process

Figure 17:
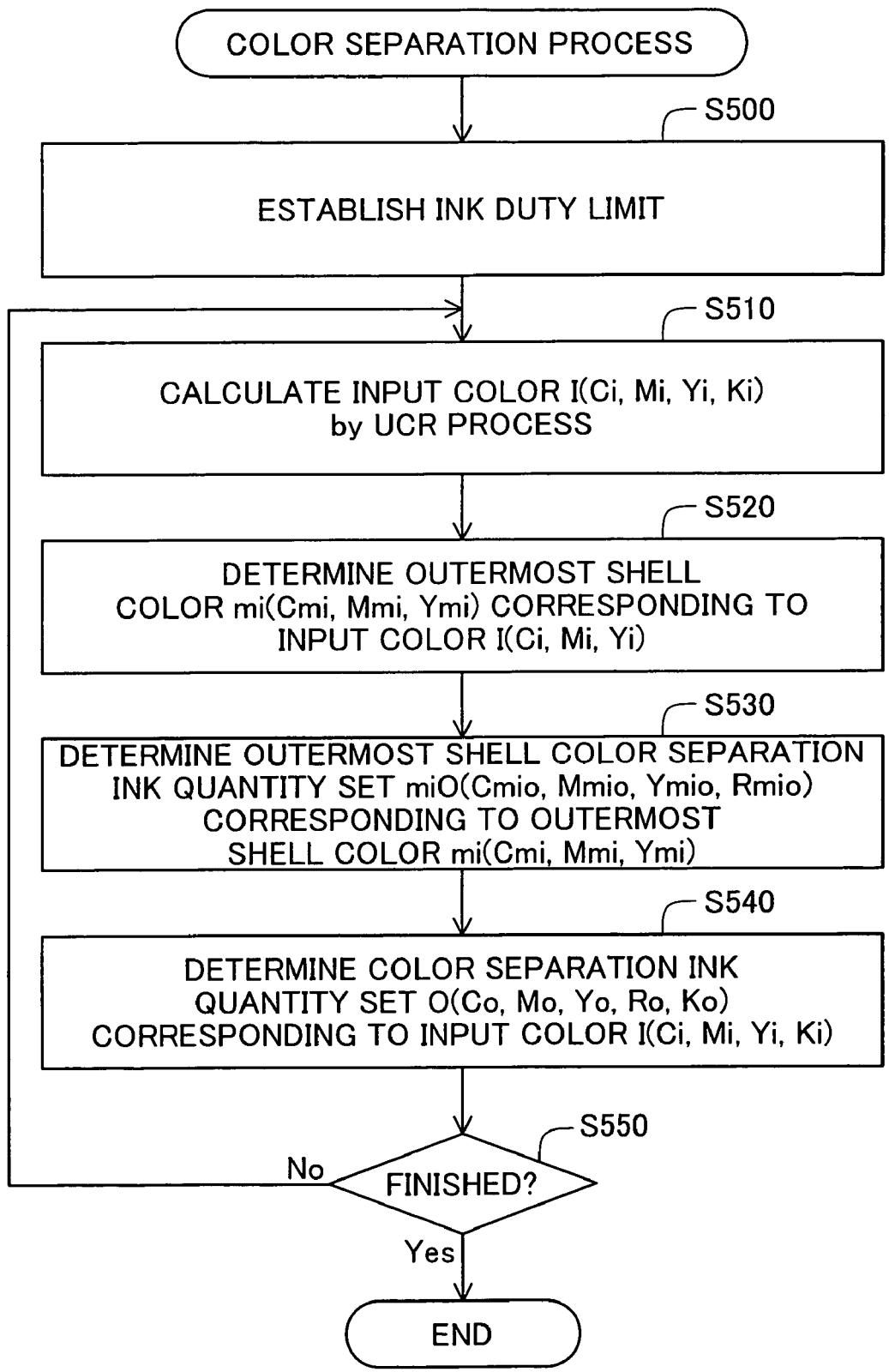
FIG. 17 is a flowchart depicting a color separation processing routine.

FIG. 17 is a flowchart depicting the processing routine of Embodiment 4 of the color separation process. A point of difference with the color separation process embodiment of FIG. 15 described previously is that an Under Color Removal (UCR) process S510 using black ink K is executed. The UCR process of this embodiment is a process wherein some chromatic primary color ink C, M, Y tone values are substituted with black ink K tone values. Since the UCR process may be implemented by various widely known methods, a detailed description will not be provided here.

In Step S500, an ink duty limit, which is a limit as to ink quantity for each color of the ink set, are established. A difference with the ink duty limit in the embodiment shown in FIG. 15 is that it is established with consideration to the ink quantity of black ink K described in detail later.

Next, in Step S510, the UCR process is executed on an input color targeted for color separation processing; for example, the UCR process is executed on the input color represented by the model tone value set used in Step S20 in FIG. 6. As a result, an input color I represented by tone values Ci, Mi, Yi, Ki of the colors C, M, Y, K is obtained. In this embodiment, of these tone values, tone values Ci, Mi, Yi of the colors C, M, Y are subjected to a color separation process using outermost shell color mi. The series of processes S530-S540 is the same as processes S310-S330 of the embodiment shown in FIG. 15. As a result, there are obtained color separation ink quantities Co, Mo, Yo, Ro for the tone values Ci, Mi, Yi of the colors C, M, Y. For black ink K, the tone value Ki obtained as the result in the UCR process S510 is used as color separation ink quantity Ko.

In this way, in the color separation process of Embodiment 4, there is performed a color separation process that effectively utilizes the reproducible range of color using black ink K in addition to chromatic primary color inks C, M, Y and spot color ink R. This makes it possible to perform printing with an additionally extended color reproduction range.

In this embodiment, it is preferable for the ink duty limit described earlier to include a limit that takes into consideration ink quantity of black ink K. For example, as regards the limit pertaining to quantity of all inks given in Equation (2), the sum of ink quantities of the colors C, M, Y, R in conjunction with the ink quantity Ki of black ink K derived in Step S510 can be set so as to be equal to or less than Duty_T. By so doing, ejection of ink in quantities exceeding the limit of ink absorbency of the print medium can be avoided. As regards the limit pertaining to ink quantity in the case of color mixtures of several color inks as well, limits can be established using ink quantity Ki of black ink K. As regards the limit pertaining to ink quantity of black in K alone, this are preferably taken into consideration when calculating ink quantity Ki during the UCR process S510.

When the color separation process of this embodiment is implemented in Step S20 of the color conversion lookup table creation process illustrated in FIG. 6, the second tone value set consists of tone values represented by ink quantities of the chromatic primary color inks C, M, Y, spot color ink R, and black ink K. Thus, in Step S30, color patches reproduced using the colors C, M, Y, R, K are created.

Also, in this embodiment, the UCR process of Step S510 is executed on the assumption that the C, M, Y color components have uniform balance of coloring. Accordingly, as relates to the C, M, Y color components, tone values may be uniformly deducted and substituted with a tone value of black ink. In this case as well, since balance of ink quantities of the C, M, Y colors in the primary color space is determined on the basis of primary coloring factors, the color separation ink quantity set O can reduce bias in color balance of reproduced color.

As described hereinabove, in the preceding embodiments, primary coloring factors correlated to primary color mixture ratios of the actually used inks are established, and determination of the color separation ink quantity set is carried out such that the ratios of ink quantities in the primary color space are given by multiplying the tone value of each color ink in the model color space by the primary coloring factors. Thus in a reproduced color, bias towards an ink having strong coloring can be reduced. As a result, high accuracy of color conversion can be attained. Also, since bias in color balance of color patches close to achromatic color can be reduced, decline in accuracy of color conversion of colors close to achromatic color can be reduced, making it possible to create a color conversion lookup table having good accuracy vis-à-vis human color perception. Additionally, even in instances where it is possible to use a spot color ink of hue different from the primary color inks, since the color separation process is carried out on the basis of substitution ink quantities that represent the intensity of coloring of the spot color ink, bias in color balance of reproduced color can be minimized on the basis of the primary coloring factors.

F. Variation Examples:

F1. Variation Example 1:

In the embodiments hereinabove, the primary coloring factors are defined to be ink quantities according to the primary color mixture ratios while the maximum ink quantity is assigned a value of 1. That is, ratios of the color components of primary coloring factors are equal to the primary color mixture ratios. However, it is not necessary for the ratios of primary coloring factors to be strictly equal to the primary color mixture ratios; typically, if primary coloring factors are correlated to primary color mixture ratios, bias in color balance of reproduced color may be reduced, even where coloring differs depending on the ink.

Correlation between the primary coloring factor and the primary color mixture ratio may be evaluated, for example, based on an angle of two vectors that represent the primary coloring factor and the primary color mixture ratio, respectively, where the vectors are represented by three color components. Here, a smaller angle may be considered to indicate stronger correlation. For example, where the primary color mixture ratio is (C, M, Y)=(1.0, 1.0, 0.5), if primary coloring factor is (C, M, Y)=(1.0, 1.0, 0.7), the angle will be about 7 degrees. In order to minimize bias in color balance, it is preferable to establish a primary coloring factor having high correlation. Here, when correlation is evaluated in terms of this angle, it is preferable for the angle to be 20 degrees or smaller, and more preferably 10 degrees or smaller; ideally, it will be 0 degrees, i.e., the ratio of each color components of the primary coloring factor is equal to its primary color mixture ratio.

Correlation between primary coloring factor and a primary color mixture ratio may also be evaluated based on differences in magnitude of the color components in the factor and the ratio. For example, if a maximum color component of a primary color mixture ratio is 1 and that of a primary coloring factor is also 1, the correlation is stronger, the smaller the difference of each color component between the primary color mixture ratio and the primary coloring factor. For example, where the primary color mixture ratio is (C, M, Y)=(1.0, 1.0, 0.5) and primary coloring factor is (C, M, Y)= (1.0, 1.0, 0.7), deviation of the primary coloring factor ratio from the primary color mixture ration is 40% (=(0.7−0.5)/ 0.5). In order to minimize bias in color balance, it is preferable for this deviation to be small; preferably, it is no more than 40%, more preferably no more than 20%, and ideally 0, i.e., the ratio of each color components of the primary coloring factor is equal to its primary color mixture ratio.

F2. Variation Example 2

In Embodiment 4 shown in FIG. 17, the UCR process using black ink K may be carried with consideration to the primary coloring factor. For example, the color separation ink quantity set O for an input color I may be determined with consideration to the primary coloring factor. In this case, the color separation process of Embodiments 1-3 (FIG. 8, FIG. 11, FIG. 15), which does not involve performing a UCR process, may be used. Next, from each ink quantity in the resultant color separation ink quantity set, an ink quantity depending on the primary coloring factor ratio is deducted, and substituted with an ink quantity of black ink K. By so doing, a UCR process can be executed, while still suppressing bias in color balance of reproduced color.

F3. Variation Example 3

In the embodiments hereinabove, hues of inks of the useable ink set are different from one another; however, an arrangement permitting the use of a plurality of types of ink having substantially identical hue but different densities is acceptable as well. In this case, by using inks of different densities depending on tone value of a hue, it is possible to improve graininess that tends to stand out more when there are small numbers ink dots, as well as to reduce banding that tends to stand out more when there are large numbers of ink dots. At this time, quantity of each ink may be calculated using a so-called linear programming method, taking ink quantities for all inks into consideration when establishing conditions such as the aforementioned ink duty limits and substitution ink quantities. A method of calculating color separation ink quantity on a hue-by-hue basis, and redistributing ink quantities so derived to a plurality of inks of substantially identical hue but different densities, may also be acceptable. In this case as well, it is preferable to establish ink duty limits that take into consideration ink quantities of all inks, and to ensure that final ink quantities of the inks meet the ink duty limits.

In the preceding embodiments, "ink quantity" refers to tone value of each ink representing a range of 0%-100%— where ink quantity for reproducing a solid area is 100%—, which is output from a color conversion lookup table. Where use of a plurality of types of ink of substantially identical hue but different densities is possible, color separation can be accomplished by making the total value of colorant of lighter and darker inks having the same hue correspond to "ink quantity." By assigning "ink quantities" derived thusly to lighter and darker inks, appropriate color can be reproduced.

F4. Variation Example 4

The ink duty limits in Embodiment 4 (FIG. 15) hereinabove are not limited to instances where spot color ink is used, and may be imposed on each ink of the ink set. For example, in the embodiment shown in FIG. 12, if the outermost shell color separation ink quantity set miO4 is established within a range meeting ink duty limits, the color separation ink quantity set will also be established within a range meeting ink duty limits, enabling high quality printing to be carried out depending on type of ink and printing medium.

F5. Variation Example 5

In the embodiments hereinabove, ink sets of various kinds different from the ink set in FIG. 5 may be implemented. Type of colorants and concentration of colorants used in an ink set may be determined in consideration of color reproducibility and picture quality of printed images. Here, even where there are differences in coloring characteristic depending on the ink, if determination of the color separation ink quantity set is carried out such that the ratio of each ink quantity in a primary color space is equal to the tone value of each color in a model color space, multiplied by a primary coloring factor, it is possible to reduce bias in color balance of reproduced color patches, thereby improving accuracy of color conversion.

F6. Variation Example 6

In the embodiment hereinabove employing spot color ink (FIGS. 14-16(a)-16(c)), in some instances, a plurality of ink quantity combinations may be possible within the substitutable range of chromatic primary color ink and spot color ink, for the color separation ink quantity set O of an input color I. In such instances, in preferred practice, the combination having the smallest total ink amount, but still within the range meeting ink duty limits, may be selected from among the plurality of ink quantity combinations for use as the color separation ink quantity set O. By so doing, picture quality of printed images can be improved, while providing savings in the amount of ink used. Also, when lightness of a reproduced color is high, it is preferable to use a combination that proactively uses chromatic primary color ink. Where chromatic primary color ink is used proactively, ink quantities of the plurality of chromatic primary color inks increase according to substitution ink quantities, and thus the total number of ink dots recorded on the printing medium increases. As a result, graininess, which tends to stand out more in bright areas, can be made less likely to stand out. It is preferable to use a combination that proactively uses chromatic primary color ink, when a reproduced color has low saturation. Colors of low saturation can be reproduced using chromatic primary color ink only. Accordingly, proactive use of chromatic primary color ink for such low-saturation colors provides savings of spot color ink.

F7. Variation Example 7:

The present invention is applicable also to thermal transfer printers or drum scan printers. The invention may be implemented not only in so-called ink jet printers, but more generally in printing devices that reproduce color by means of mixing inks of several colors. Such printing devices include, for example, fax machines and copy machines.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of creating color conversion information for converting input color image data represented by a first color system to second color image data represented by a reproduction color system, the reproduction color system being a color system for reproducing color on a print medium using an ink set including a plurality of chromatic primary color inks that used in combination can reproduce achromatic color, the plurality of chromatic primary color inks having unequal balance of ink quantities when achromatic color is reproduced, the method comprising:
   (a) establishing a first correspondence relationship for converting a first tone value set represented by the first color system to a model color tone value set represented by a model color system, the model color system being a hypothetical color system of a plurality of hypothetical chromatic primary color inks, the plurality of hypothetical chromatic primary color inks having a different balance of ink quantities from the unequal balance of the plurality of chromatic primary color inks when achromatic color is reproduced;
   (b) establishing a color separation correspondence relationship for converting a model tone value set for each of a plurality of input colors within the model color system into a combination of ink quantities of the ink set; and
   (c) generating, based on the first correspondence relationship and the color separation correspondence relationship, a correspondence relationship between a first tone value set represented by the first color system and a combination of ink quantities of the ink set, and storing the generated correspondence relationship in the color conversion information, wherein
   a color space for ink quantities of the plurality of chromatic primary color inks is termed a primary color space, and wherein the step (b) includes:
   (b1) establishing a primary coloring factor for each of the plurality of chromatic primary color inks, the primary coloring factor being correlated to a primary color mixture ratio which is a ratio of ink quantities when achromatic color is reproduced by a mixture of the plurality of chromatic primary color inks; and
   (b2) determining a combination of ink quantities of the ink set as a color separation ink quantity set associated with each of the plurality of input colors, the determining being made such that a ratio of ink quantities of the color separation ink quantity set represented in the primary color space is equal to a ratio of tone values of the model tone value set for each input color multiplied by the primary coloring factors for the chromatic primary color inks.

2. An image data processing apparatus for converting input color image data represented by a first color system into output color image data represented by a reproduction color system, the apparatus comprising:
   color conversion information created according to the method of claim 1; and
   a color conversion module for executing a color conversion process using the color conversion information.

3. A method according to claim 1, wherein deviation of the ratio of the primary coloring factors from the primary color mixture ratio is no more than 40%.

4. A method according to claim 3, wherein the ratio of the primary coloring factors is substantially equal to the primary color mixture ratio.

5. A method according to claim 1, wherein
   the ink set includes at least one spot color ink of different hue than any of the chromatic primary color inks,
   a unit quantity of the spot color ink can be substituted with substitution ink quantities of a plurality of the chromatic primary color inks to reproduce substantially same hue and saturation, and
   the ink quantities of the color separation ink quantity set represented in the primary color space are determined by substituting ink quantity of the spot color ink in the color separation ink quantity set with the plurality of chromatic primary color inks based on the substitution ink quantities.

6. A method according to claim 1, wherein the step (b2) includes the steps of:
   (b2-1) determining an outermost shell color separation ink quantity set associated with an outermost shell color, where the outermost shell color refers to a color at an outermost shell location of a model color space represented by base vectors indicating tone values of the model color system, the determining being made such that a ratio of ink quantities of the outermost shell color separation ink quantity set represented in the primary color space is equal to a ratio of tone values of a model tone value set for the outermost shell color multiplied by the primary coloring factors for the chromatic primary color inks; and
   (b2-2) determining the color separation ink quantity set associated with each of the plurality of input colors in the model color system based on relationship between the outermost shell color and the outermost shell color separation ink quantity set.

7. A method according to claim 6, wherein the step (b2-2) includes calculating the color separation ink quantity set by multiplying the outermost shell color separation ink quantity set for the outermost shell color having a same vector direction as the input color in the model color space, by a ratio of a vector length of the input color to a vector length of the outermost shell color.

8. A method according to claim 6, wherein the step (b2-1) includes:
   establishing an upper limit of useable ink quantity per unit of area of the print medium as an ink duty limit;
   and wherein determination of the outermost shell color separation ink quantity set is performed so as to meet the following condition:
   (i) the outermost shell color separation ink quantity set is within the ink duty limit.

9. A method according to claim 6, wherein
determination of the outermost shell color separation ink quantity set is performed so as to meet the following condition:
(ii) a vector length of the outermost shell color separation ink quantity set represented in the primary color space is greatest within a range reproducible by the ink set.

10. A method according to claim 6, wherein
determination of the outermost shell color separation ink quantity set is performed so as to meet the following condition:
(iii) a total ink quantity of the outermost shell color separation ink quantity set is smallest possible.

11. A method according to claim 1, wherein the ink set includes black ink,
and wherein the step (b) includes executing an under color removal on the input color to obtain a corrected input color composed of a plurality of chromatic primary color components from which a black component has been removed by means of the under color removal,
and wherein the color separation ink quantity set is determined according to the corrected input color.

12. A method of determining ink quantities in order to reproduce color on a print medium using an ink set including a plurality of chromatic primary color inks that used in combination can reproduce achromatic color, the plurality of chromatic primary color inks having unequal balance of ink quantities when achromatic color is reproduced, wherein a color system for reproducing a color on the print medium using the ink set is termed a reproduction color system, a hypothetical color system of a plurality of hypothetical chromatic primary color inks is termed a model color system, the plurality of hypothetical chromatic primary color inks having a different balance of ink quantities from the unequal balance of the plurality of chromatic color inks when achromatic color is reproduced, a tone value set represented by the model color system is termed a model tone value set, and a color space for ink quantities of the plurality of chromatic primary color inks is termed a primary color space, the method comprising:

(a) establishing a color separation correspondence relationship for converting a model tone value set for each of a plurality of input colors within the model color system into a combination of ink quantities of the ink set, the step (a) including:

(a1) establishing a primary coloring factor for each of the plurality of chromatic primary color inks, the primary coloring factor being correlated to a primary color mixture ratio which is a ratio of ink quantities when achromatic color is reproduced by a mixture of the plurality of chromatic primary color inks; and (a2) determining a combination of ink quantities of the ink set as a color separation ink quantity set associated with each of the plurality of input colors, the determining being made such that a ratio of ink quantities of the color separation ink quantity set represented in the primary color space is equal to a ratio of tone values of the model tone value set for each input color multiplied by the primary coloring factors for the chromatic primary color inks.

* * * * *